US 6,650,382 B1

(12) United States Patent
Sumida et al.

(10) Patent No.: US 6,650,382 B1
(45) Date of Patent: Nov. 18, 2003

(54) REFLECTIVE LCD WITH FRONT LIGHT AND PROTECTIVE MEMBER WITH WINDOW

(75) Inventors: Yukihiro Sumida, Nara (JP); Takeshi Masuda, Kyoto (JP); Tsuyoshi Ebi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 154 days.

(21) Appl. No.: 09/594,602

(22) Filed: Jun. 15, 2000

(30) Foreign Application Priority Data

Jun. 15, 1999 (JP) .......................... 11-169012
Apr. 20, 2000 (JP) ....................... 2000-120040

(51) Int. Cl.⁷ .......................................... G02F 1/1335
(52) U.S. Cl. ....................................................... 349/63
(58) Field of Search ................................. 349/113, 63

(56) References Cited

U.S. PATENT DOCUMENTS

| | | | | |
|---|---|---|---|---|
| 4,626,074 A | * | 12/1986 | Crossland et al. ............. 349/65 |
| 5,365,357 A | * | 11/1994 | Ohgawara et al. .......... 349/111 |
| 5,870,160 A | * | 2/1999 | Yanagawa et al. ........... 349/141 |
| 5,917,565 A | * | 6/1999 | Suzuki ........................ 349/65 |
| 5,986,737 A | * | 11/1999 | Evanicky et al. ............ 349/137 |
| 6,048,071 A | * | 4/2000 | Sawayama .................... 362/32 |
| 6,053,619 A | * | 4/2000 | Nakamura et al. ............ 362/31 |
| 6,196,692 B1 | * | 3/2001 | Umemoto et al. ............. 362/31 |
| 6,246,455 B1 | * | 6/2001 | Iijima et al. ................... 349/65 |
| 6,285,420 B1 | * | 9/2001 | Mizumo et al. .............. 349/65 |
| 6,369,866 B1 | * | 4/2002 | Rai et al. ...................... 349/61 |

OTHER PUBLICATIONS

CX. PAL vol. 40 (Sony Semiconductor News), Apr. 1999 pp. 26–27.

* cited by examiner

*Primary Examiner*—Kenneth Parker
(74) *Attorney, Agent, or Firm*—Nixon & Vanderhye P.C.

(57) ABSTRACT

A reflective type LCD is provided with a front-light. The front light includes an optical film provided on the large face of a lightguide which faces the liquid crystal display device. A two dimensional area defined by the optical film is greater than a two dimensional area defined by a window formed in the protection member, but less than a two dimensional area defined by the lightguide, so that at least a portion of a peripheral edge of the optical film is located between the end face of the window and the end face of the light guide as viewed from a front of the LCD apparatus.

37 Claims, 11 Drawing Sheets

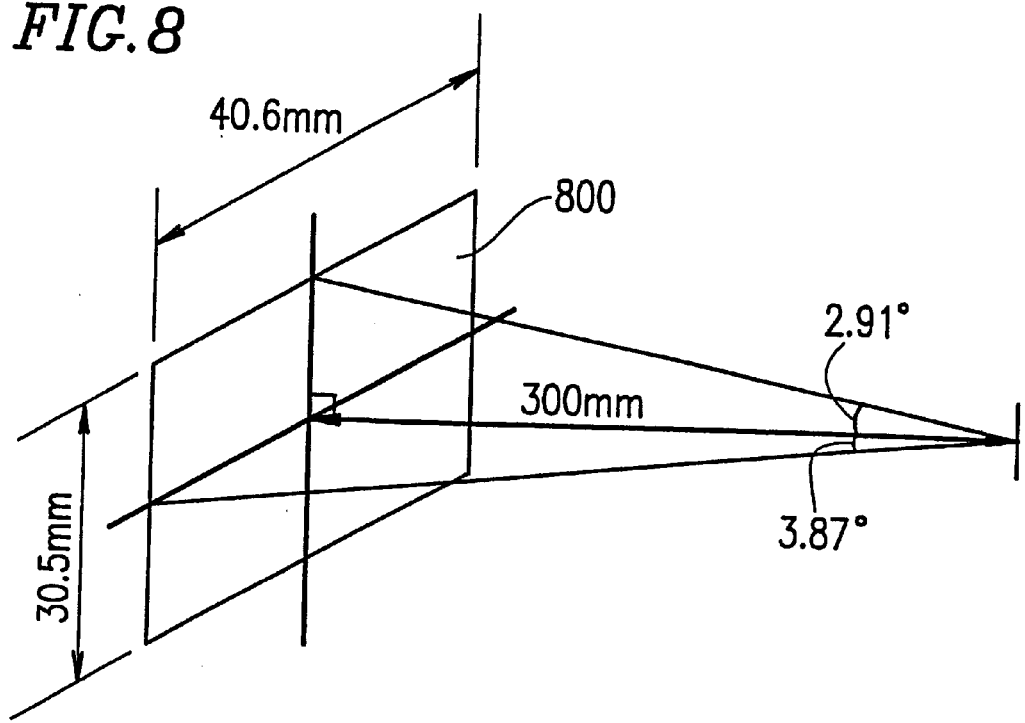

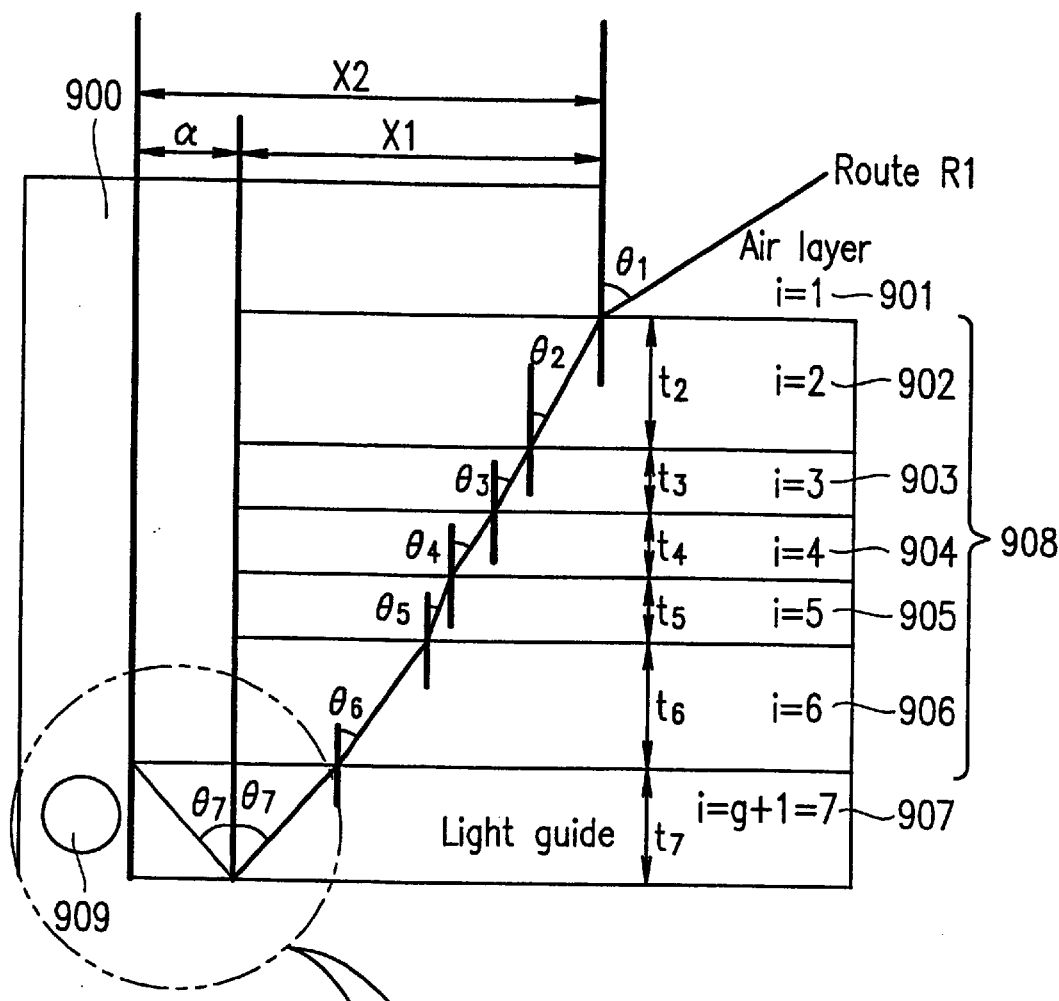
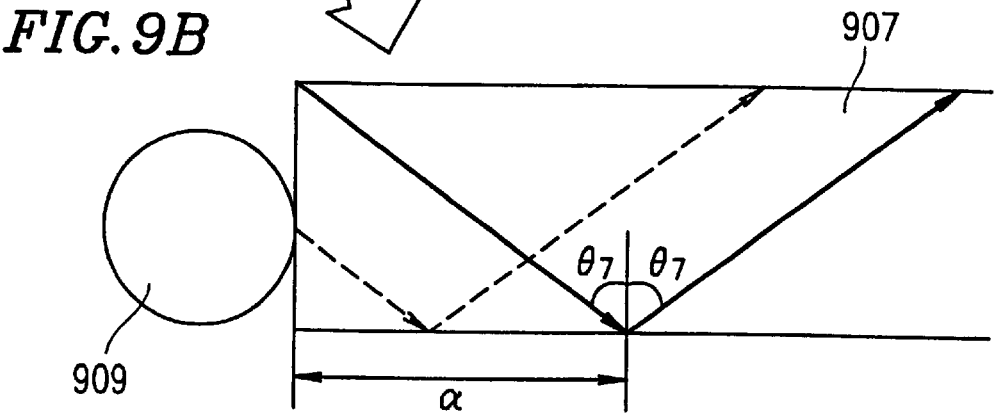

REFLECTIVE LCD WITH FRONT LIGHT AND PROTECTIVE MEMBER WITH WINDOW

BACKGROUND OF THE INVENTION

1. Field of the Invention

The present invention relates to a reflective type liquid crystal display apparatus that is used for a display function of information display systems, office automation equipment, etc. Specifically, the present invention relates to a reflective type liquid crystal display apparatus including a front light for efficiently illuminating a liquid crystal display device without deteriorating the display quality thereof. Such a display apparatus is therefore preferable for use in portable information terminals or equipment for mobile computing. The present invention also relates to portable electric equipment including such a reflective type liquid crystal display apparatus.

2. Description of the Related Art

In general, liquid crystal display apparatus can be divided into two groups: a group of transmissive type liquid crystal display apparatus which display letters, images, etc., by adjusting the amount of transmitted light which is emitted from a particular light source; and a group of reflective type liquid crystal display apparatus which display letters, images, etc., using ambient light.

The transmissive type liquid crystal display apparatus includes a light source such as a fluorescent light, an electroluminescence (EL) device, or the like, placed on the back surface of a liquid crystal device as a planar light source (backlight). On the other hand, the reflective type liquid crystal display apparatus does not require a backlight because it displays images using ambient light. Thus, the reflective type liquid crystal display apparatus enjoys advantages such as light weight, thin shape, low power consumption, etc. Furthermore, in a highly bright environment in which sunlight is incident directly on the display device, the reflective type liquid crystal display apparatus enables a viewer to observe images more clearly, whereas the transmissive type liquid crystal display apparatus exhibits serious deterioration in the visibility of images. Thus, demands for the reflective type liquid crystal display apparatus have been increasing, and such a reflective type device is more likely for application in portable electronic equipment such as portable information terminals or apparatus for mobile computing.

However, it is sometimes impossible for the reflective type liquid crystal display apparatus to provide sufficient display in a dark environment such as nighttime or the like because the reflective type liquid crystal display apparatus uses ambient light for display and the display brightness thereof heavily depends on environmental conditions. Specifically, such a drawback is a major problem in a reflective type liquid crystal display apparatus which uses a color filter for displaying color images or in a reflective type liquid crystal display apparatus which uses polarizing plates.

In order to address such a drawback, it has been proposed to provide an illumination device called a front light for illuminating, in the case of insufficient ambient light, a reflective type liquid crystal device from the front face thereof.

For example, CX. PAL Vol. 40 (Sony Semiconductor News pp. 26–27) describes an example of such a front light. This document discloses a conventional front light including a light guide for converting a light from a light source into planar emission light, and an optical film composed of a polarizing plate and a quarter-wave plate which are combined and placed on the emission surface side of the light guide.

However, the above-described conventional art involves the drawbacks described below.

In general, an electronic information apparatus is covered with a case (a protection element) for protecting a liquid crystal display device. The case is provided with a window through which a viewer observes a display screen. For example, referring to FIG. 11A, in a reflective type liquid crystal display apparatus 450, a window 401a is formed in a size larger than a display area 402 which corresponds to a plurality of pixels formed in the reflective type liquid crystal display device.

The window 401a is designed so that an unobservable display area does not occur (i.e., the entire display area 402 can be seen) even when observed from an oblique direction. This is because peripheral portions 402y of the display area 402 cannot be seen when a viewer 400 observes the display area 402 through the window 401a from an oblique direction (a direction not vertical to the screen) as shown in FIG. 11B. The window 401a is typically formed larger than the display area 402 by about 1 mm in each direction, in consideration of an attachment margin as well as an unobservable display area 402y.

In a reflective type liquid crystal display apparatus including a front light (an illuminator) for illuminating a reflective type liquid crystal display device, the front light and the liquid crystal display device are covered with a case, and a window is formed in a viewer-side face of the case through which the viewer observes the screen of the liquid crystal display device.

In such a structure, when the size of the light guide is too large relative to the size of the window, electronic equipment becomes large, and the portability thereof may therefore deteriorate. Furthermore, in the case where the size of the light guide of the front light is smaller than the size of the window, light leaks from end faces of the light guide when the light is on, which is observable by the viewer. As a result, display quality of the liquid crystal display apparatus significantly deteriorates.

Furthermore, in the case where an optical film is provided under a lower surface of the light guide (an opposite side to the viewer), especially when an adhesion layer is provided between the light guide and the optical film, light leaks from the end faces of the light guide, end faces of the optical film, and an interface between the adhesion layer and the light guide. As a result, display quality significantly deteriorates.

Yet, CX. PAL Vol. 40 (Sony Semiconductor News pp. 26–27) does not disclose any means of solving such problems.

SUMMARY OF THE INVENTION

According to one aspect of the present invention, a reflective type liquid crystal display apparatus includes: a reflective type liquid crystal display device for displaying images by reflecting incident light in such a manner that the incident light is separately controlled for each pixel; a front light positioned at a front face side of the reflective type liquid crystal display device, the front light including a light source and a light guide, wherein light emitted from the light source enters the light guide from an end face thereof near the light source, and the light is output from a large face of the light guide which faces the liquid crystal display device;

and a protection member for covering the reflective type liquid crystal display device and the front light, wherein a window is formed in the protection member at a front face side of the front light for a viewer to observe the images displayed on the reflective type liquid crystal display device, wherein, at a side of the front light in which the light source is not provided, a distance between an end face of the window formed in the protection member and an end face of light guide adjacent thereto is determined so that light incident in a direction within a desirable viewing angle range passes through a lower face of the light guide.

In one embodiment of the present invention, the protection member covers an end portion of the light guide such that distance X1 between an end face of the window and an end face of the light guide is within the following range:

$$0 \leq X1 \leq \sum_{i=1}^{g} (t_{i+1}/\tan(90° - \sin^{-1}((n_i/n_{i+1})X\sin\theta_i)))$$

(where $t_{i+1}$ is a thickness of the (i+1)th layer; $n_i$ and $n_{i+1}$ are refractive indices of the i-th layer and the (i+1)th layer, respectively; angle $\theta_i$ is an angle between a direction of light incident on the i-th layer and a direction perpendicular to the front light; the angle $\theta_1$ in the 1st layer is a maximum angle within a desirable viewing angle range; and the relationship $n_i \times \sin \theta_i = n_{i+1} \times \sin \theta_{i+1}$ is satisfied); and the front light includes g layers; the adjacent layers have different refractive indices; the g-th layer is adjacent to the light guide; and the (g+1)th layer is the light guide.

In another embodiment of the present invention, when i=1, $n_i$=1.00.

In still another embodiment of the present invention, when i=1, $\theta_1$=80°.

In still another embodiment of the present invention, the protection member covers an end portion of the light guide such that distance X1 between an end face of the window and an end face of the light guide is within the following range:

$$\sum_{i=1}^{g} (t_{i+1}/\tan(90° - \sin^{-1}((n_i/n_{i+1})X\sin\varphi_i))) \leq$$

$$X1 \leq \sum_{i=1}^{g} (t_{i+1}/\tan(90° - \sin^{-1}((n_i/n_{i+1})X\sin\theta_i)))$$

(where $t_{i+1}$ is a thickness of the (i+1)th layer: $n_i$ and $n_{i+1}$ are refractive indices of the i-th layer and the (i+1)th layer, respectively; angle $\theta_i$ is an angle between a direction of light incident on the i-th layer and a direction perpendicular to the front light; the angle $\theta_1$ in the 1st layer is a maximum angle within a desirable viewing angle range; angle $\phi_i$ is an angle between a direction of light incident on the i-th layer and a direction perpendicular to the front light; the angle $\phi_1$ in the 1st layer is a perspective angle; and the relationships $n_i \times \sin \theta_i = n_{i+1} \times \sin \theta_{i+1}$, and $n_i \times \sin \phi_i = n_{i+1} \times \sin \phi_{i+1}$ are satisfied); and the front light includes g layers; the adjacent layers have different refractive indices; the g-th layer is adjacent to the light guide; and the (g+1)th layer is the light guide.

In still another embodiment of the present invention, the perspective angle $\phi_1$, in the 1st layer (i=1) is smaller than 4°.

In still another embodiment of the present invention, the front light further includes an optical film positioned on a large face of the light guide which faces the reflective type liquid crystal display device.

In still another embodiment of the present invention, at a side in which the light source is not provided, the protection member covers an end portion of the optical film such that distance X3 between an end face of the window and an end face of the optical film is within the following range:

$$0 \leq X3 \leq \sum_{k=1}^{m} (t_{k+1}/\tan(90° - \sin^{-1}((n_k/n_{k+1})X\sin\theta_k)))$$

(where $t_{k+1}$ is a thickness of the (k+1)th layer; $n_k$ and $n_{k+1}$ are refractive indices of the k-th layer and the (k+1)th layer, respectively: angle $\theta_k$ is an angle between a direction of light incident on the k-th layer and a direction perpendicular to the front light: the angle $\theta_1$ in the 1st layer is a maximum angle within a desirable viewing angle range; and the relationship $n_k \times \sin \theta_k = n_{k+1} \times \sin \theta_{k+1}$ is satisfied); and the front light includes m layers; the adjacent layers have different refractive indices; the m-th layer is the light guide; and the (m+1)th layer is the optical film.

In still another embodiment of the present invention, when k=1, $n_i$=1.00.

In still another embodiment of the present invention, when k=1, $\theta_1$=80°.

In still another embodiment of the present invention, the protection member covers an end portion of the optical film such that distance X3 between an end face of the window and an end face of the optical film is is within the following range:

$$\sum_{k=1}^{m} (t_{k+1}/\tan(90° - \sin^{-1}((n_k/n_{k+1})X\sin\varphi_k))) \leq$$

$$X3 \leq \sum_{k=1}^{m} (t_{k+1}/\tan(90 - \sin^{-1}((n_k/n_{k+1})X\sin\theta_k)))$$

(where $t_{k+1}$ is a thickness of the (k+1)th layer: $n_k$ and $n_{k+1}$ are refractive indices of the k-th layer and the (k+1)th layer, respectively; angle $\theta_k$ is an angle between a direction of light incident on the k-th layer and a direction perpendicular to the front light; the angle $\theta_1$ in the 1st layer is a maximum angle within a desirable viewing angle range; angle $\phi_k$ is an angle between a direction of light incident on the k-th layer and a direction perpendicular to the front light; the angle $\phi_1$ in the 1st layer is a perspective angle; and the relationships $n_k \times \sin \theta_k = n_{k+1} \times \sin \theta_{k+1}$, and $n_k \times \sin \phi_k = n_{k+1} \times \sin \phi_{k+1}$ are satisfied); and the front light includes m layers; the adjacent layers have different refractive indices; the m-th layer is the light guide; and the (m+1)th layer is the optical film.

In still another embodiment of the present invention, the perspective angle $\phi_1$ in the 1st layer (k=1) is smaller than 4°.

In still another embodiment of the present invention, the optical film has an anti-reflection effect.

In still another embodiment of the present invention, the optical film includes a polarizing plate and a quarter-wave plate.

In still another embodiment of the present invention, the optical film includes a polarizing plate, a half-wave plate, and a quarter-wave plate.

According to another aspect of the present invention, portable electronic equipment includes the reflective type liquid crystal display apparatus of claim 1.

According to still another aspect of the present invention, a reflective type liquid crystal display apparatus includes: a reflective type liquid crystal display device for displaying images by reflecting incident light in such a manner that the incident light is separately controlled for each pixel; a front light positioned at a front face side of the reflective type liquid crystal display device, the front light including a light source and a light guide, wherein light emitted from the light source enters the light guide from an end face thereof near the light source, and the light is output from a large face of the light guide which faces the liquid crystal display device; and a protection member for covering the reflective type liquid crystal display device and the front light, wherein a window is formed in the protection member at a front face side of the front light for a viewer to observe the images displayed on the reflective type liquid crystal display device, wherein, at a side of the front light in which the light source is provided, a distance between an end face of the window formed in the protection member and an end face of light guide adjacent thereto is determined so that light which is emitted from the light source and reflected by a lower face of the front light is not observed by the viewer.

In one embodiment of the present invention, the protection member covers an end portion of the light guide such that distance X2 between an end face of the window and an end face of the light guide is within the following range:

$$0 \leq X2 \leq \left\{ \sum_{i=1}^{g} (t_{i+1}/\tan(90° - \sin^{-1}((n_i/n_{i+1}) X \sin\theta_i))) \right\} +$$
$$(t_{g+1}/\tan(90° - \sin^{-1}((n_g/n_{g+1}) X \sin\theta_g)))$$

(where $t_{i+1}$ is a thickness of the (i+1)th layer; $n_i$ and $n_{i+1}$ are refractive indices of the i-th layer and the (i+1)th layer, respectively, angle $\theta_i$ is an angle between a direction of light incident on the i-th layer and a direction perpendicular to the front light; the angle $\theta_1$ in the 1st layer is a maximum angle within a desirable viewing angle range; and the relationship $n_i \times \sin\theta_i = n_{i+1} \times \sin\theta_{i+1}$ is satisfied); and the front light includes g layers; the adjacent layers have different refractive indices: the g-th layer is adjacent to the light guide; and the (g+1)th layer is the light guide.

In another embodiment of the present invention, when i=1, $n_1$=1.00.

In still another embodiment of the present invention, when i=1, $\theta_1$=80°.

In still another embodiment of the present invention, the protection member covers an end portion of the light guide such that distance X2 between an end face of the window and an end face of the light guide is within the following range:

$$\sum_{j=1}^{g} (t_{i+1}/\tan(90° - \sin^{-1}((n_i/n_{i+1}) X \sin\varphi_i))) +$$
$$(t_{g+1}/\tan(90° - \sin^{-1}((n_g/n_{g+1}) X \sin\varphi_g))) \leq$$
$$X2 \leq \left\{ \sum_{i=1}^{g} (t_{i+1}/\tan(90° - \sin^{-1}((n_i/n_{i+1}) X \sin\theta_i))) \right\} +$$
$$(t_{g+1}/\tan(90° - \sin^{-1}((n_g/n_{g+1}) X \sin\theta_g)))$$

(where $t_{i+1}$ is a thickness of the (i+1)th layer; $n_i$ and $n_{i+1}$ are refractive indices of the i-th layer and the (i+1)th layer, respectively; angle $\theta_i$ is an angle between a direction of light incident on the L-th layer and a direction perpendicular to the front light; the angle $\theta_1$ in the 1st layer is a maximum angle within a desirable viewing angle range; angle $\varphi_i$ is an angle between a direction of light incident on the i-th layer and a direction perpendicular to the front light: the angle $\varphi_1$ in the 1st layer is a perspective angle: and the relationships $n_i \times \sin\theta_i = n_{i+1} \times \sin\theta_{i+1}$, and $n_i \times \sin\varphi_i = n_{i+1} \times \sin\varphi_{i+1}$ are satisfied); and the front light includes g layers; the adjacent layers have different refractive indices; the g-th layer is adjacent to the light guide; and the (g+1)th layer is the light guide.

In still another embodiment of the present invention, the perspective angle $\varphi_1$ in the 1st layer (i=1) is smaller than 4°.

In still another embodiment of the present invention, the front light further includes an optical film positioned on a large face of the light guide which faces the reflective type liquid crystal display device.

In still another embodiment of the present invention, at a side in which the light source is provided, the protection member covers an end portion of the optical film such that distance X4 between an end face of the window and an end face of the optical film is within the following range:

$$0 \leq X4 \leq \left\{ \sum_{k=1}^{m} (t_{k+1}/\tan(90° - \sin^{-1}((n_k/n_{k+1}) X \sin\theta_k))) \right\} +$$
$$(t_m/\tan(90° - \sin^{-1}((n_{m-1}/n_m) X \sin\theta_{m-1}))) +$$
$$(t_{m+1}/\tan(90° - \sin^{-1}((n_m/n_{m+1}) X \sin\theta_m)))$$

(where $t_{k+1}$ is a thickness of the (k+1)th layer; $n_k$ and $n_{k+1}$ are refractive indices of the k-th layer and the (k+1)th layer, respectively; angle $\theta_k$ is an angle between a direction of light incident on the k-th layer and a direction perpendicular to the front light: the angle $\theta_1$ in the 1st layer is a maximum angle within a desirable viewing angle range; and the relationship $n_k \times \sin\theta_k = n_{k+1} \times \sin\theta_{k+1}$ is satisfied); and the front light includes m layers; the adjacent layers have different refractive indices; the m-th layer is the light guide: and the (m+1)th layer is the optical film.

In still another embodiment of the present invention, when k=1, $n_1$=1.00.

In still another embodiment of the present invention, when k=1, $\theta_1$=80°.

In still another embodiment of the present invention, the protection member covers an end portion of the optical film such that distance X4 between an end face of the window and an end face of the optical film is within the following range:

$$\sum_{k=1}^{m} (t_{k+1}/\tan(90° - \sin^{-1}((n_k/n_{k+1}) X \sin\varphi_k))) +$$
$$(t_m/\tan(90° - \sin^{-1}((n_{m-1}/n_m) X \sin\varphi_{m-1}))) +$$
$$(t_{m+1}/\tan(90° - \sin^{-1}((n_m/n_{m+1}) X \sin\varphi_m))) \leq$$
$$X4 \leq \left\{ \sum_{k=1}^{m} (t_{k+1}/\tan(90° - \sin^{-1}((n_k/n_{k+1}) X \sin\theta_k))) \right\} +$$
$$(t_m/\tan(90° - \sin^{-1}((n_{m-1}/n_m) X \sin\theta_{m-1}))) +$$
$$(t_{m+1}/\tan(90° - \sin^{-1}((n_m/n_{m+1}) X \sin\theta_m)))$$

(where $t_{k+1}$ is a thickness of the (k+1)th layer: $n_k$ and $n_{k+1}$ are refractive indices of the k-th layer and the (k+1)th layer, respectively: angle $\theta_k$ is an angle between a direction of light incident on the k-th layer and a direction perpendicular to the front light; the angle $\theta_1$ in the 1st layer is a maximum angle within a desirable viewing angle range; angle $\varphi_k$ is an angle between a direction of light incident on the k-th layer and a direction perpendicular to the front light; the angle $\varphi_1$ in the 1st layer is a perspective angle; and the relationships $n_k \times \sin\theta_k = n_{k+1} \times \sin\theta_{k+1}$, and $n_k \times \sin\varphi_k = n_{k+1} \times \sin\varphi_{k+1}$ are satisfied); and the front light includes m layers; the adjacent layers have different refractive indices; the m-th layer is the light guide; and the (m+1)th layer is the optical film.

In still another embodiment of the present invention, the perspective angle in the 1st layer (k=1) is smaller than 4°.

In still another embodiment of the present invention, the optical film has an anti-reflection effect.

In still another embodiment of the present invention, the optical film includes a polarizing plate and a quarter-wave plate.

In still another embodiment of the present invention, the optical film includes a polarizing plate, a half-wave plate, and a quarter-wave plate.

According to still another aspect of the present invention, portable electronic equipment includes the reflective type liquid crystal display apparatus of claim 17.

Hereinafter, the functions of the present invention will be described.

As described above, window 401a is provided in a viewer's side face of a protection member (case) that protects a liquid crystal display device such that an entire display area can be seen even from an oblique direction. However, when the area of the front face of the light guide is smaller than the area of the window 401a, light leaks from peripheral end faces of the light guide, resulting in significant deterioration of the display quality. In order to address such a drawback, a distance X1 (FIG. 1B) between an end face of the light guide and an end face of the window corresponding thereto is set in a range of 0≦X1, so that the peripheral portion of the light guide is covered with a case. In the case where the display area of the liquid crystal display device is small, the distance X1 may also be small. In this case, the end face of the window and the end face of the light guide are observed substantially in the same viewing direction. When the end face of the light guide is located outside the end face of the window, i.e., 0≦X1, light leakage from the end faces of the light guide does not occur.

A typical liquid crystal display device has a viewing angle range up to about 80° from a direction perpendicular to a screen of the liquid crystal display device (angle 0°). Thus, the light guide may be designed in a size such that the viewing angle range up to about 80° is considered, and thus it is not necessary to design the light guide larger than such a size.

The "viewing angle range" of the liquid crystal display device used herein represents a range in which displayed images can be normally seen, excluding a case where a viewer cannot correctly recognize displayed images. Outside the viewing angle range, a black displayed image may appear whitish, or gray-scale inversion may occur, resulting in the deterioration in the contrast or the inversion of the contrast.

As described above, a large-size light guide results in a large-size electronic equipment, whereby portability of the electronic equipment may be reduced. In the present invention, for the purpose of avoiding such a drawback, at a side of a light guide in which a light source is not provided, an end portion of the light guide is covered with a case so that the distance X1 between the end face of the light guide and the end face of the window is within the following range:

$$0 \leq X1 \leq \sum_{j=1}^{g} (t_{i+1} / \tan(90° - \sin^{-1}((n_i/n_{i+1}) X \sin\theta_i)))$$

(where, in an air layer of the window (i=1), $n_1$=1.00 and $\theta_1$=80°). With such an arrangement, light leakage from the end faces of the light guide and the unnecessary reflected light can be prevented over the viewing angle range from 0° (lower limit) to 80° (upper limit) without spoiling the portability of the liquid crystal display apparatus. Thus, such a liquid crystal display apparatus can be applied to a large-size screen which requires a large viewing angle range, as well as a small-size screen which does not require a large viewing angle range. Furthermore, such a liquid crystal display apparatus is suitable for use in a small-size electronic information apparatus of low power consumption.

An observable area for the viewer should be considered in order to prevent light leakage from the light guide. For example, as shown in FIG. 8, in the case where the viewer observes the center of a 2" reflective type liquid crystal display device (panel 800) in a direction substantially perpendicular to the panel 800 from a position which is 300 mm away from the panel 800, an area corresponding to an angle of 3.87° (about 4°) in the horizontal direction and an angle of 2.91° (about 3°) in the vertical direction can be observed.

Therefore, in the case where the light guide is provided in front of the liquid crystal display device, the light guide is positioned so as to cover the entire area corresponding to a perspective angle, whereby light leakage from the end face of the light guide can be prevented from reaching the viewer's eye. For example, in the case of employing a 2" reflective type liquid crystal display device, the light guide is designed and positioned so as to cover the entire area corresponding to a perspective angle of about 3°, whereby light leakage toward the viewer can be prevented. More preferably, an area corresponding to a perspective angle of about 4° is considered. In the case of employing a 2" or greater reflective type liquid crystal display device, the perspective angle becomes larger, and an area corresponding there to also becomes larger. In such a case, it is preferable that the light guide is designed and positioned, in consideration of a viewing angle characteristic of the liquid crystal display device, so as to cover an area corresponding to a viewing angle range up to about 80° or smaller. Thus, in the present invention, at the side in which the light source is not provided, it is preferable that the end portion of the light guide is covered with the case so that distance X1 between the end face of the window and the end face of the light guide is within the following range:

$$\sum_{i=1}^{g} (t_{i+1} / \tan(90° - \sin^{-1}((n_i/n_{i+1}) X \sin\varphi_i))) \leq$$

$$X1 \leq \sum_{i=1}^{g} (t_{i+1} / \tan(90° - \sin^{-1}((n_i/n_{i+1}) X \sin\theta_i)))$$

(where, in the air layer of the window (i=1), perspective angle $\varphi_1$ is smaller than 4°). With such an arrangement, even in the case of employing a front light for illuminating a small-size liquid crystal display device, light leakage is prevented, and the display quality therefore improves.

Furthermore, according to a viewing angle range required by the liquid crystal display device, at the side in which the light source is not provided, it is preferable that the case covers the end portion of the light guide so that distance X1 between the end face of the window and the end face of the light guide is within the following range:

$$\sum_{i=1}^{g} (t_{i+1} / \tan(90° - \sin^{-1}((n_i/n_{i+1}) X \sin\varphi_i))) \leq$$

$$X1 \leq \sum_{i=1}^{g} (t_{i+1} / \tan(90° - \sin^{-1}((n_i/n_{i+1}) X \sin\theta_i)))$$

(where, in the air layer of the window (i=1), $\varphi_1$ is a required perspective angle). With such an arrangement, light leakage can be prevented in accordance with a viewing angle characteristic of the liquid crystal display device, and the display quality therefore improves.

On the other hand, at a side in which the light source is provided, relative to the sides in which the light source is not provided, the intensity of light from the light source is greater, and the light emitted from the light source and reflected by the lower face of the light guide should be prevented from reaching the viewer's eye.

For example, assume an exemplary arrangement in which a touch panel 908, which serves as an input/output device, is provided at the viewer side of the light guide 907 as shown in FIG. 9A. At a side in which the light source 909 is provided (light source side), light incident in the direction of maximum viewing angle $\theta_1$ (light introduced from an air layer 901 (i=1)) travels through a PET film 902, a transparent electrode 903, an air layer 904, a transparent electrode 905, a glass substrate 906, and a light guide 907, and reaches the lower face of the light guide 907 (route R1). The traveling light is refracted by respective interfaces between adjacent layers according to Snell's law. Thus, while traveling from the upper face of the PET film 902 to the lower face of the light guide 907 which is provided as the (g+1)th layer (7th layer in this example), the light shifts by distance X1 in the horizontal direction. (It should be noted that the front light herein includes g layers.) As shown in FIG. 6A, at a side in which the light source is not provided, the distance between the end face of the window and the end face of the light guide 607 is only required to be larger than X1. For reference, distance X1 is shown in FIG. 9A. As shown in FIG. 9A, at a side in which the light source 909 is provided, in order to prevent light which is emitted from the light source 909 and then reflected by the lower face of the light guide 907 from traveling through route R1 to reach the viewer's eye, distance X2 between the end face of the case 900 and the end face of the light guide 907 needs to include distance α in addition to distance X1. Since a portion of the light emitted from the light source 909 is reflected by the lower face of the light guide 907 as shown in FIG. 9B (a partially enlarged view of FIG. 9A), distance a is determined in consideration of angle $\theta_7$, the thickness $t_7$ of the light guide 907, and the refractive index of the light guide 907. Thus, in the present invention, at the light source side, it is preferable that an end portion of the light guide is covered with the case so that distance X2 between the end face of the window and the end face of the light guide is within the following range:

$$0 \leq X2 \leq \left\{ \sum_{i=1}^{g} (t_{i+1}/\tan(90° - \sin^{-1}((n_i/n_{i+1})X\sin\theta_i))) \right\} +$$

$$(t_{g+1}/\tan(90° - \sin^{-1}((n_g/n_{g+1})X\sin\theta_g)))$$

With such an arrangement, in a viewing angle range from 0° (lower limit) to preferably 80° (upper limit), light leakage from the end face of the light guide is prevented, and the light emitted from the light source and then reflected by the lower face of the light guide is prevented from reaching the viewer's eye, without spoiling the portability of the liquid crystal display apparatus.

Furthermore, also at the light source side, it is preferable that distance X2 between the end face of the window of the case and the end face of the light guide is set in consideration of a length corresponding to prospective angles of the panel as described above (e.g., in a 2" reflective type liquid crystal display device, about 3° in the vertical direction, and about 4° in the horizontal direction).

For example, it is preferable that the case covers the end portion of the light guide so that distance X2 between the end face of the window and the end face of the light guide is within the following range:

$$\sum_{j=1}^{g}(t_{i+1}/\tan(90° - \sin^{-1}((n_i/n_{i+1})X\sin\varphi_i))) +$$

$$(t_{g+1}/\tan(90° - \sin^{-1}((n_g/n_{g+1})X\sin\varphi_g))) \leq$$

$$X2 \leq \left\{ \sum_{i=1}^{g} (t_{i+1}/\tan(90° - \sin^{-1}((n_i/n_{i+1})X\sin\theta_i))) \right\} +$$

$$(t_{g+1}/\tan(90° - \sin^{-1}((n_g/n_{g+1})X\sin\theta_g)))$$

(where, in the air layer of the window (i=1), $\phi_1$ is a required perspective angle). With such an arrangement, light leakage can be prevented in accordance with a viewing angle characteristic of the liquid crystal display device, and the display quality therefore improves.

Alternatively, in the case where an optical film is provided on a lower face of the light guide, light leaks from peripheral end faces of the optical film. Thus, it is preferable that the end faces of the optical film is covered with the case so that, at the side in which the light source is not provided as shown in FIG. 7, distance X3 between the end face of the window and the end face of the optical film is within the following range:

$$0 \leq X3 \leq \sum_{k=1}^{m} (t_{k+1}/\tan(90° - \sin^{-1}((n_k/n_{k+1})X\sin\theta_k)))$$

(where, in the air layer of the window (k=1), $n_1=1.00$, $\theta_1$ is within a desirable viewing angle range (preferably 80°)).

In such a case, at the side in which the light source is not provided, considering an area corresponding to a particular perspective angle (with respect to the end face of the window), it is also preferable that the end portion of the optical film is covered with the case so that distance X3 between the end face of the window and the end face of the optical film is within the following range:

$$\sum_{k=1}^{m} (t_{k+1}/\tan(90° - \sin^{-1}((n_k/n_{k+1})X\sin\varphi_k))) \leq$$

$$X3 \leq \sum_{k=1}^{m} (t_{k+1}/\tan(90° - \sin^{-1}((n_k/n_{k+1})X\sin\theta_k)))$$

(where, in the air layer of the window (k=1), $\phi_1$ is a desirable perspective angle).

Furthermore, it is preferable that, at the side in which the light source is not provided, the end portion of the optical film is covered with the case so that distance X3 between the end face of the window and the end face of the optical film is set, in accordance with a viewing angle range required for the liquid crystal display device, to be within the following range:

$$\sum_{k=1}^{m} (t_{k+1}/\tan(90° - \sin^{-1}((n_k/n_{k+1})X\sin\varphi_k))) \leq$$

$$X3 \leq \sum_{k=1}^{m} (t_{k+1}/\tan(90° - \sin^{-1}((n_k/n_{k+1})X\sin\theta_k)))$$

(where, in the air layer of the window (k=1), $\phi_1$ is a required perspective angle).

Furthermore, also in the case where an optical film is provided on the lower face of the light guide, at the light source side, relative to the side in which the light source is not provided, the intensity of light from the light source is greater, and the light emitted from the light source and then reflected by the lower face of the light guide should be prevented from reaching the viewer's eye.

For example, assume an exemplary arrangement in which a touch panel 1010, which serves as an input/output device, is provided at the viewer side of the light guide 1007 as shown in FIG. 10A. At a side in which the light source 1011 is provided (light source side), light incident in the direction of maximum viewing angle $\theta_1$ (light introduced from an air layer 1001 (k=1)) travels through a PET film 1002, a transparent electrode 1003, an air layer 1004, a transparent electrode 1005, a glass substrate 1006, a light guide 1007, and an optical film 1008, and reaches the lower face of the optical film 1008 (route R2). The traveling light is refracted by respective interfaces between adjacent layers according to Snell's law. Thus, while traveling from the upper face of the PET film 1002 to the lower face of the light guide 1007 which is provided as the (m+1)th layer (8th layer in this example), the light shifts by distance X3 in the horizontal direction. (It should be noted that the front light herein includes layers.) As shown in FIG. 7, at a side in which a light source is not provided, a distance between an end face of the case and an end face of the optical film 708 is only required to be larger than X3. As shown in FIG. 10A, at a side in which a light source 1011 is provided, in order to prevent light which is emitted from the light source 1011 and reflected by the lower surface of the optical film 1008 from traveling through route R2 to reach the viewer's eye, distance X4 between the end face of the window formed in the case 1000 and the end face of the optical film 1008 needs to include distance β in addition to distance X3. Since a portion of the light emitted from the light source 1011 is reflected by the lower face of the optical film 1008 as shown in FIG. 10B (a partially enlarged view of FIG. 10A), distance β is determined in consideration of angle $\theta_7$, angle $\theta_8$, the thicknesses $t_6$ and $t_7$ of the light guide 1007 and the optical film 1008, and the refractive indices of the light guide 1007 and the optical film 1008. Thus, in the present invention, at the light source side, it is preferable that an end portion of the optical film is covered with the case so that distance X4 between the end face of the window and the end face of the optical film is within the following range:

$$0 \leq X4 \leq \left\{ \sum_{k=1}^{m} (t_{k+1}/\tan(90° - \sin^{-1}((n_k/n_{k+1})X\sin\theta_k))) \right\} +$$
$$(t_m/\tan(90° - \sin^{-1}((n_{m-1}/n_m)X\sin\theta_{m-1}))) +$$
$$(t_{m+1}/\tan(90° - \sin^{-1}((n_m/n_{m+1})X\sin\theta_m)))$$

(where, in the air layer of the window (k=1), $\phi_1$ is a required perspective angle). With such an arrangement, in a viewing angle range from 0° (lower limit) to preferably 80° (upper limit), light reflection which occurs in a direction of the thickness of the optical film, and light reflection by the optical film which occurs around the optical film due to insufficient compensation of a phase by the optical film, can be prevented.

Furthermore, also at the light source side, it is preferable that distance X3 between the end face of the window of the case and the end face of the optical film is set in consideration of a length corresponding to prospective angles of the panel as described above (e.g., in a 2" reflective type liquid crystal display device, about 3° in the vertical direction, and about 4° in the horizontal direction).

For example, it is preferable that, at the side in which the light source is provided, the end portion of the optical film is covered with the case so that distance X4 between the end face of the window and the end face of the optical film is set, in accordance with a viewing angle range required for the liquid crystal display device, to be within the following range:

$$\sum_{k=1}^{m} (t_{k+1}/\tan(90° - \sin^{-1}((n_k/n_{k+1})X\sin\varphi_k))) +$$
$$(t_m/\tan(90° - \sin^{-1}((n_{m-1}/n_m)X\sin\varphi_{m-1}))) +$$
$$(t_{m+1}/\tan(90° - \sin^{-1}((n_m/n_{m+1})X\sin\varphi_m))) \leq$$
$$X4 \leq \left\{ \sum_{k=1}^{m} (t_{k+1}/\tan(90° - \sin^{-1}((n_k/n_{k+1})X\sin\theta_k))) \right\} +$$
$$(t_m/\tan(90° - \sin^{-1}((n_{m-1}/n_m)X\sin\theta_{m-1}))) +$$
$$(t_{m+1}/\tan(90° - \sin^{-1}((n_m/n_{m+1})X\sin\theta_m)))$$

(where, in the air layer of the window (k=1), $\phi_1$ is a required perspective angle).

In the case where a film having an anti-reflection effect is employed as the optical film, interference between light emitted from the light source and light reflected by an emission surface of the light guide (a large face of the light guide which faces the liquid crystal display device) can be prevented.

In the case where a film composed of a polarizing plate and a quarter-wave plate is employed as the optical film, unnecessary reflection light reflected by the quarter-wave plate or by a surface of a counter (upper) glass substrate of the liquid crystal display device is removed, whereby contrast deterioration can be prevented.

Alternatively, in the case where a film composed of a polarizing plate, a half-wave plate, and a quarter-wave plate is employed as the optical film, the tolerance of the phase delay with respect to the wavelength of the light is compensated for, whereby a circularly polarized state of light can be maintained. As a result, unnecessary reflection light reflected by the quarter-wave plate or by a surface of a counter glass substrate of the liquid crystal display device can be further prevented.

In the specification of the present invention, light incident in the direction of maximum viewing angle is considered. The route of the incident light (for example, route R1 of FIGS. 9 or route R2 of FIG. 10) is identical to a route of light leaking from the reflection surface to the viewer's eye, although a direction of travelling light is inversive. Thus, it is apparent to those skilled in the art that the distance between the end face of the light guide and the end face of the window of the case or the distance between the end face of the optical film and the end face of the window of the case can be determined based on the route of the incident light so that the light lea)age through the same route can be prevented.

Thus, the invention described herein makes possible the advantage of providing a reflective type liquid crystal display apparatus and a portable electric device in which light leakage from (nd faces of a light guide or an optical film is prevented, without spoiling the portability of the apparatus and the: equipment, thereby increasing display quality.

This and other advantages; of the present invention will become apparent to those skilled in the art upon reading and understanding the. following detailed description with reference to the accompanying figures.

BRIEF DESCRIPTION OF THE DRAWINGS

FIG. 8 is a perspective view illustrating a perspective angle for a 2" reflective type liquid crystal display device when a viewer observes a panel of the display device.

FIG. 9A shows an exemplary arrangement of the liquid crystal display apparatus in which a touch panel is provided at a viewer's side of the light guide. Herein, a relationship between an end face of the light guide and an end face of a window formed in a case, at a side in which a light source is provided, is shown. FIG. 9B is a partially enlarged view of FIG. 9A.

DESCRIPTION OF THE PREFERRED EMBODIMENTS

Hereinafter, an embodiment of the present invention will be described with reference to the attached drawings.

Figure 1A:
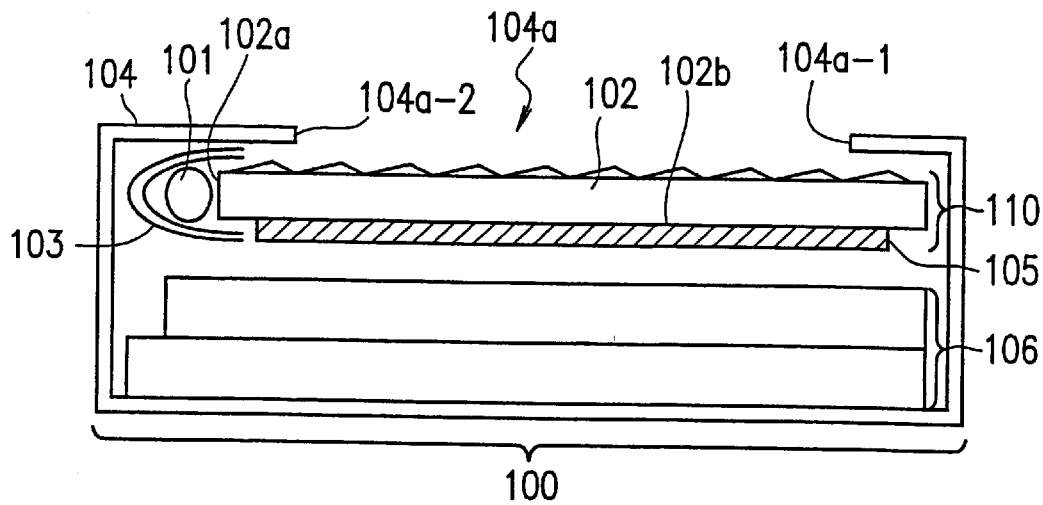
FIG. 1A is a cross-sectional view showing a schematic structure of a reflective type liquid crystal display apparatus according to an embodiment of the present invention.
Figure 1B:
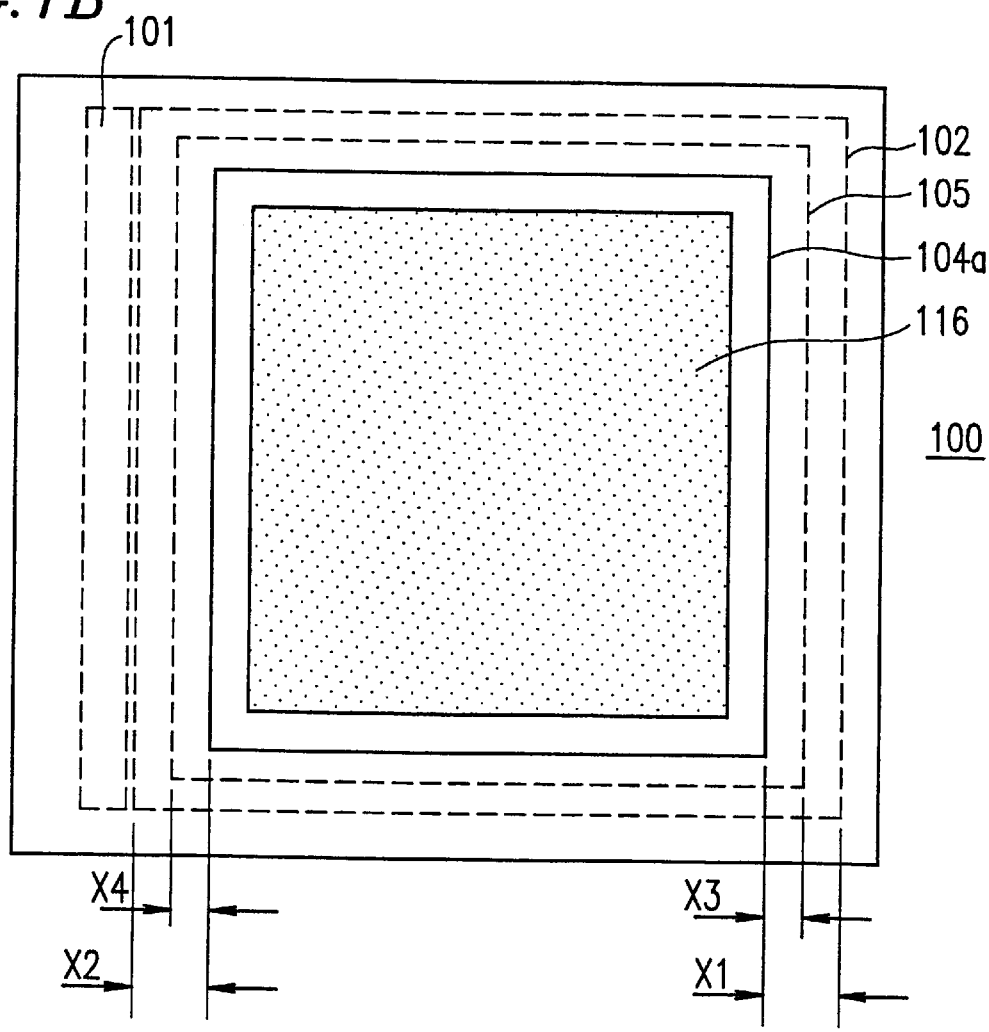
FIG. 1B is a plan view of the reflective type liquid crystal display apparatus shown in FIG. 1A.

FIG. 1A is a cross-sectional view showing a structure of a reflective type liquid crystal display apparatus 100 according to the present embodiment. FIG. 1B is a plan view of the reflective type liquid crystal display apparatus 100 shown in FIG. 1A.

The reflective type liquid crystal display apparatus 100 includes a front light 110 at a front face side (viewer's side) of the reflective type liquid crystal display device 106.

The front light 110 includes a light source 101, a diffuse reflection sheet 103 covering the light source 101, a light guide 102, and an optical film 105 provided at a back face side of the light guide 102. Light from the light source 101 enters the light guide 102 through an end face 102a thereof, and exits from a wide face (emission surface) 102b toward a reflective type liquid crystal display device 106. The light source 101, the diffuse reflection sheet 103, the front light 110, and the reflective type liquid crystal display device 106 are contained in a case (protection member) 104. The case 104 is provided with a window 104a formed in a front face thereof, as shown in FIG. 1A.

As shown in FIG. 1B, the window 104a is formed so as to include a display area 116. The light guide 102 is formed so as to be larger than the window 104a. The optical film 105 is also formed so as to be larger than the window 104a.

Figure 2A:
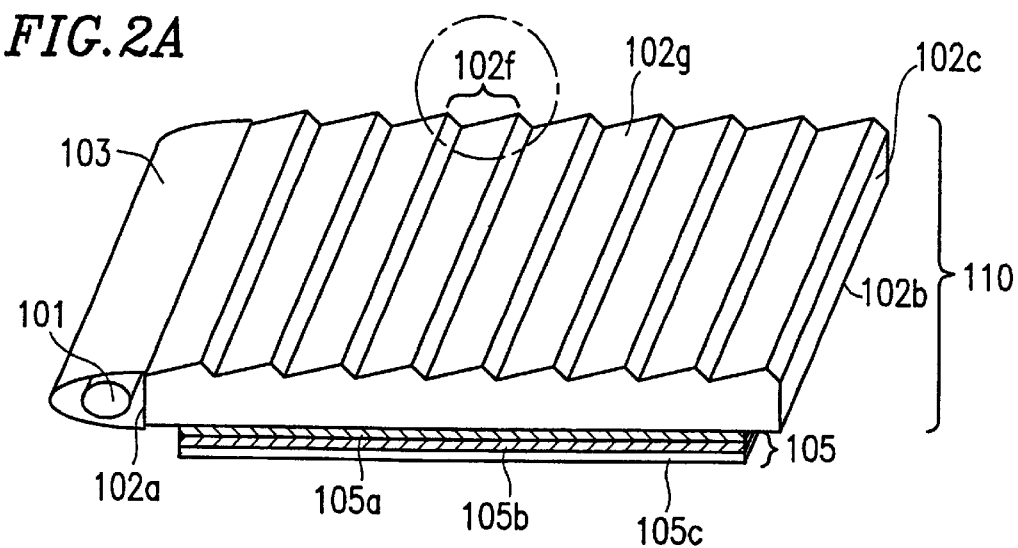
FIG. 2A is a perspective view showing a schematic structure of a front light of the reflective type liquid crystal display apparatus; shown in FIGS. 1A and 1B.
Figure 2B:
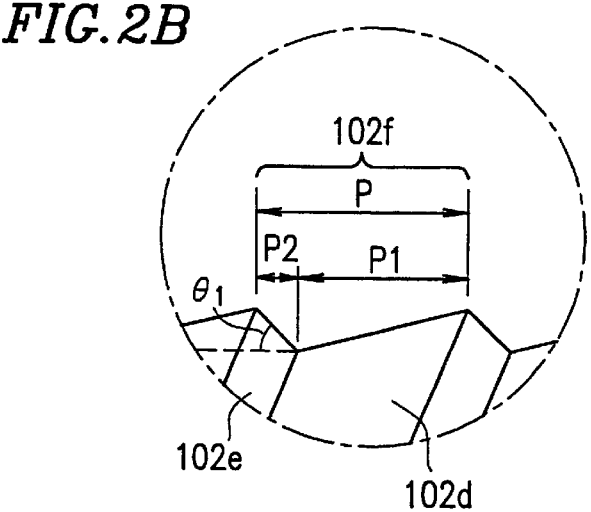
FIG. 2B is an enlarged view showing a periodic structure formed in the upper face of the light guide.

FIG. 2A is a perspective view showing a schematic structure of the front light 110 of the reflective type liquid crystal display apparatus 100 shown in FIGS. 1A and 1B. FIG. 2B is an enlarged view showing a periodic structure 102f of the light guide 102. As shown in FIG. 2A, the optical film 105 includes a polarizing plate 105a, a half-wave plate 105b, and a quarter-wave plate 105c from the viewer's side. The total thickness of the optical film 105 is 0.45 mm, and the refractive index thereof is about 1.50.

In the present embodiment, the light guide 102 is formed of polymethylmethacrylate (refractive index: n=1.49) by injection molding into a parallel plate having a thickness of 1 mm. An upper face 102g of the light guide 102 opposite to the emission surface 102b is formed so as to have a periodic structure 102f consisting of a plurality of prisms, in which each prism has a propagation portion 102d and a reflection portion 102e. Referring to FIG. 2B, the periodic structure 102f is formed such that a pitch P of the periodic structure 102f is 0.39 mm, a width P1 of the propagation portion 102d is 0.38 mm, a width P2 of the reflection portion 102e is 0.1 mm, and the inclination angle of the reflection portion 102e is about 45°. With such a structure, the light guide 102 can convert light from the light source 101 into a planar light output from the emission surface 102b, so as to illuminate the reflective type liquid crystal display device 106.

Figure 3:
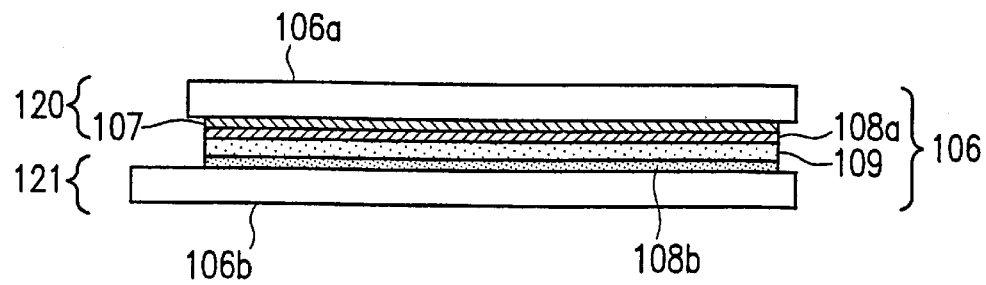
FIG. 3 is a cross-sectional view showing a schematic structure of a reflective type liquid crystal display device shown in FIG. 1A.

FIG. 3 is a cross-sectional view showing a schematic structure of the reflective type liquid crystal display device 106 of the reflective type liquid crystal display apparatus 100. The reflective type liquid crystal display device 106 includes a counter (upper) substrate 120, a TFT (thin film transistor) substrate (lower substrate) 121, and a liquid crystal layer 109 interposed between these substrates. The counter substrate 120 includes a glass substrate 106a, and a color filter 107 and a transparent electrode 108 formed thereon. The TFT substrate 121 includes a glass substrate 106b, and a plurality of TFT elements (not shown) and a reflection electrode 108b formed thereon.

As shown in FIGS. 1A and 1B, in the reflective type liquid crystal display apparatus 100, the case 104 is provided so as to cover a periphery of the reflective type liquid crystal display device 106 and the front light 110. At the front face side of the front light 110, the case 104 is provided with the window 104a, through which a viewer observes displayed images. In FIG. 1B, distance X1 is a distance, at a side in which the light source 101 is not provided, between an end face 104a-1 of the window 104a and an end face of the light guide 102. In the specification of the present application, "a side in which a light guide is not provided" may refer to any of sides other than the side in which a light source is provided (e.g., in FIG. 1B, any of the upper, lower, and right sides). Distance X2 is a distance, at the side in which the light source 101 is provided, between an end face 104a-2 of the window 104a and an end face of the light guide 102. Distance X3 is a distance, at the side in which the light source 101 is not provided, between an end face 104a-1 of the window 104a and an end face of the optical film 105. Distance X4 is a distance, at the side in which the light source 101 is provided, between an end face 104a-2 of the window 104a and an end face of the optical film 105.

In the present embodiment, the reflective type liquid crystal display device 106 is a 3.9" reflective type liquid crystal display device wherein the display area 116 is 59.4 mm×79.2 mm (vertical×horizontal). Furthermore, the size of the window 104a of the case 104 is 61.4 mm×81.2 mm (vertical×horizontal), which is larger than that of the display area 116 by 1 mm in all directions, so that the entire display area can be observed. Furthermore, in order to prevent light leakage from end faces of the light guide, the size of the light guide 102 is set to 64.7 mm×83.8 mm (vertical×horizontal), and the size of the optical film 105 is set to 63.7 mm×82.8 mm (vertical×horizontal).

Hereinafter, the mechanism of the reflective type liquid crystal display apparatus 100 for preventing light leakage will be described.

Figure 4A:
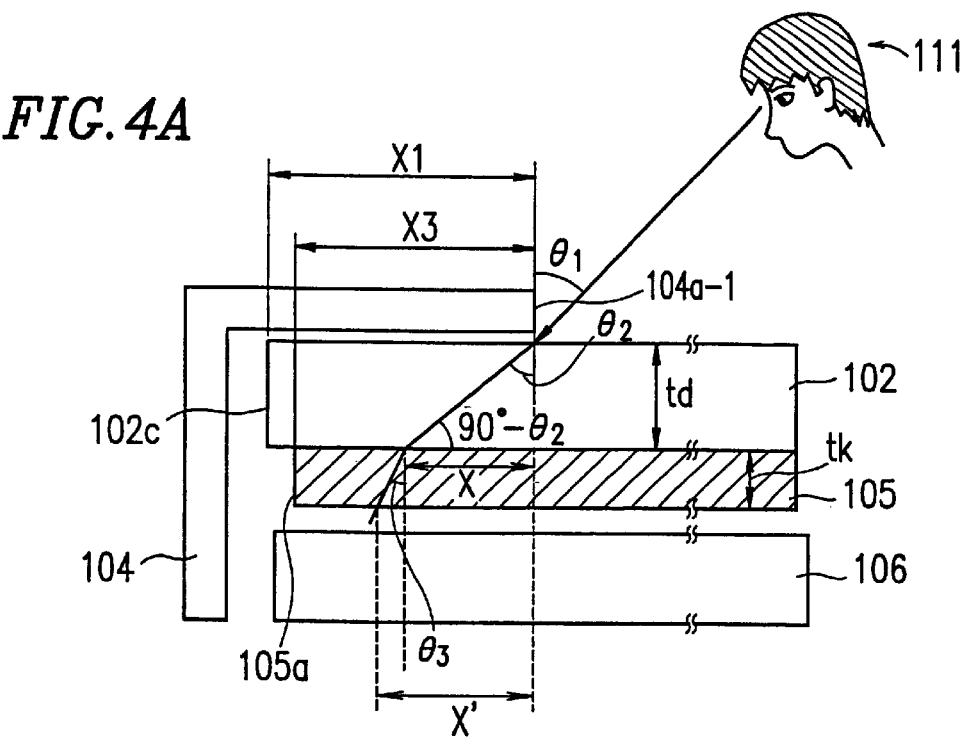
FIG. 4A is a cross-sectional view showing a structure of the liquid crystal display apparatus at a side thereof in which the light source is not provided, and illustrating geographical relationships between the case and the light guide, and between the case and the optical film.
Figure 4B:
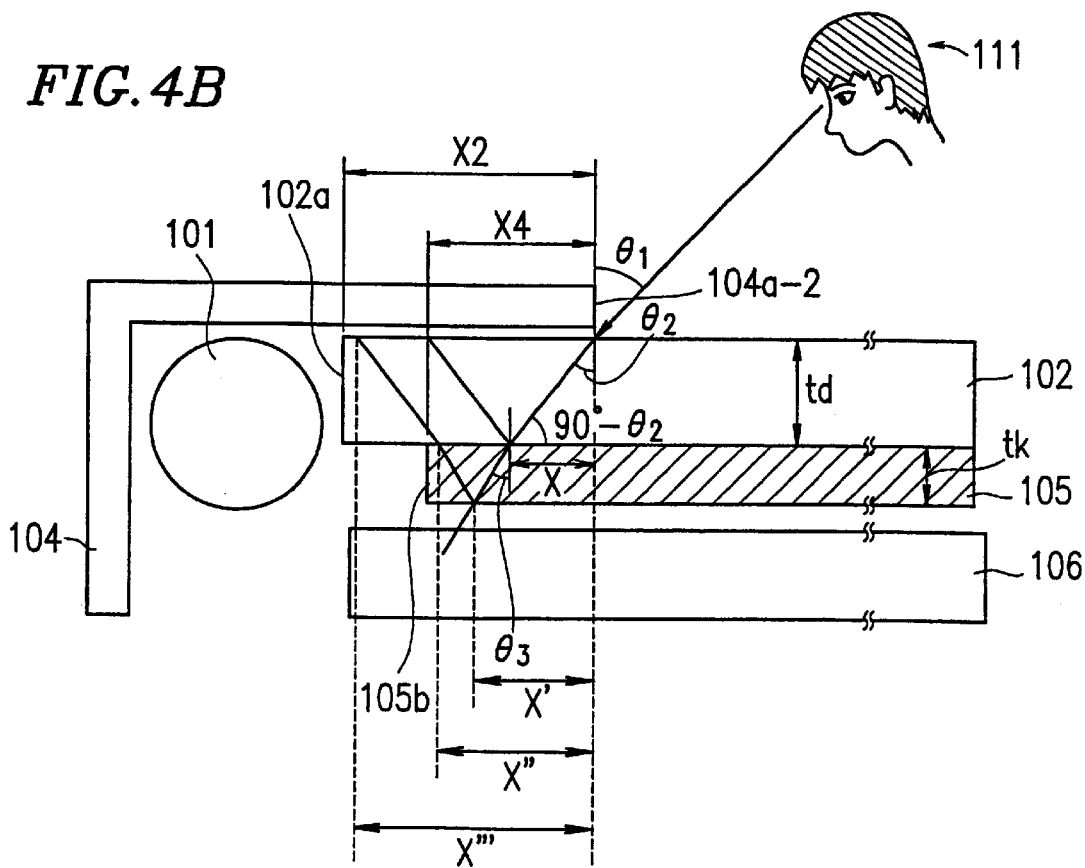
FIG. 4B is a cross-sectional view showing a structure of the liquid crystal display apparatus at a side thereof in which the light source is provided, and illustrating geographical relationships between the cover and the light guide, and between the cover and the optical film.

FIG. 4A shows a structure of the liquid crystal display apparatus 100 at the side in which the light source 201 is not provided, and illustrates a geographical relationship between the end face 102c of the light guide 102 and the end face 105a of the optical film 105. FIG. 4B shows a structure of the liquid crystal display apparatus 100 at the light source side, and illustrates geographical relationships between the case 104 and the light guide 102, and between the case 104 and the optical film 105.

Referring to FIG. 4A, in the case where a viewer 111 observes a peripheral portion of the display area 116 from the direction of an angle $\theta_1(=40°)$, considering the refractive index nd of the light guide 102 (nd=1.49) and the thickness td of the light guide 102 (td=1.00 mm), $\theta_2$ can be determined by the following expression:

1.00 (refractive index of air)×sin $\theta_1$=nd×sin $\theta_2$

Thus, the viewer 111 observes a position on the upper face of the optical film 105, which is horizontally an additional distance X from an observed position on the upper surface of the light guide 102 as calculated as follows:

$X=td/(\tan(90°-\theta^2))$ $=td/(\tan(90°-\sin^{-1}(\sin 40°/nd)))$ $=0.48$ mm.

That is, the viewer 111 observes a position on the upper face of the optical film 105, which is horizontally an additional distance of 0.48 mm from the observed position on the upper surface of the light guide 102.

Furthermore, considering the refractive index nk (=1.50) of the optical film 105 and the thickness tk (=0.45 mm) of the optical film 105, $\theta_3$ is determined by the following expression:

$nd×\sin \theta_2=nk×\sin \theta_3$

Thus, the viewer 111 observes a position on the upper face of the optical film 105, which is horizontally an additional distance X' from the observed position on the upper surface of the light guide 102 as calculated as follows:

$X'=X+tk/(\tan(90°-\theta_3))$ $=0.70$ mm

Figure 4C:
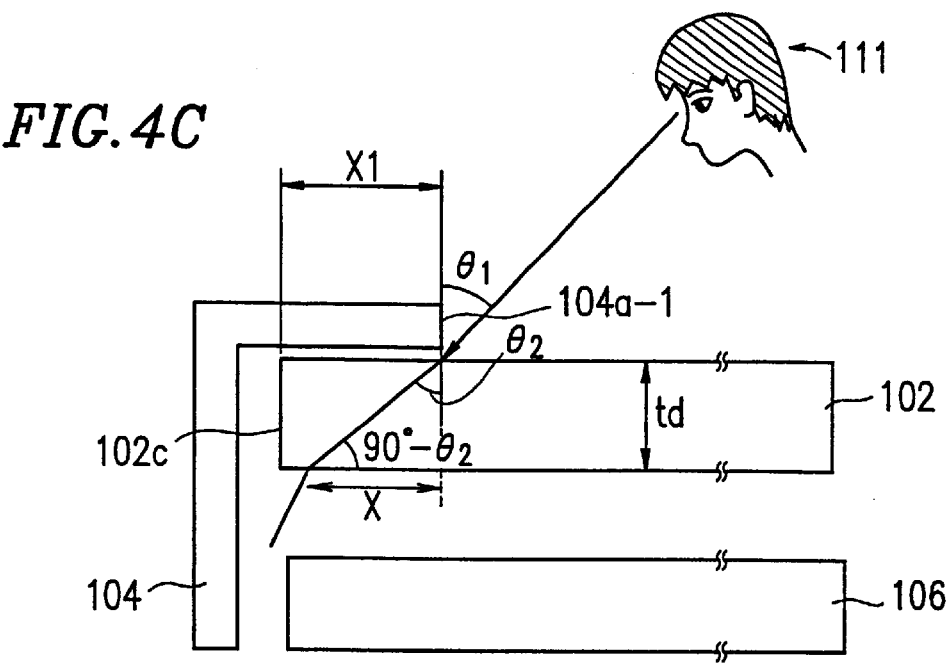
FIG. 4C is a cross-sectional view showing a structure of the liquid crystal display apparatus at a side thereof in which the light source is not provided, and illustrating a geographical relationship between the cover and the light guide.

Alternatively, referring to FIG. 4C, in the case where a front light having no optical film is employed, if distance X1 between the end face 104a-1 of the window 104a and the end face 102c of the light guide 102 is smaller than 0.48 mm, unnecessary reflected light reaches the viewer's eye without being interrupted by the case 104, whereby the display quality deteriorates. That is, at the side of the light guide in which the light source is not provided, a distance X1 between the end face 104a-5 of the case 104 and the end face 102c is determined so that any light incident in a direction within a desirable viewing angle range passes through the lower face of the light guide 102, whereby undesirable reflection light can be prevented.

Figure 4D:
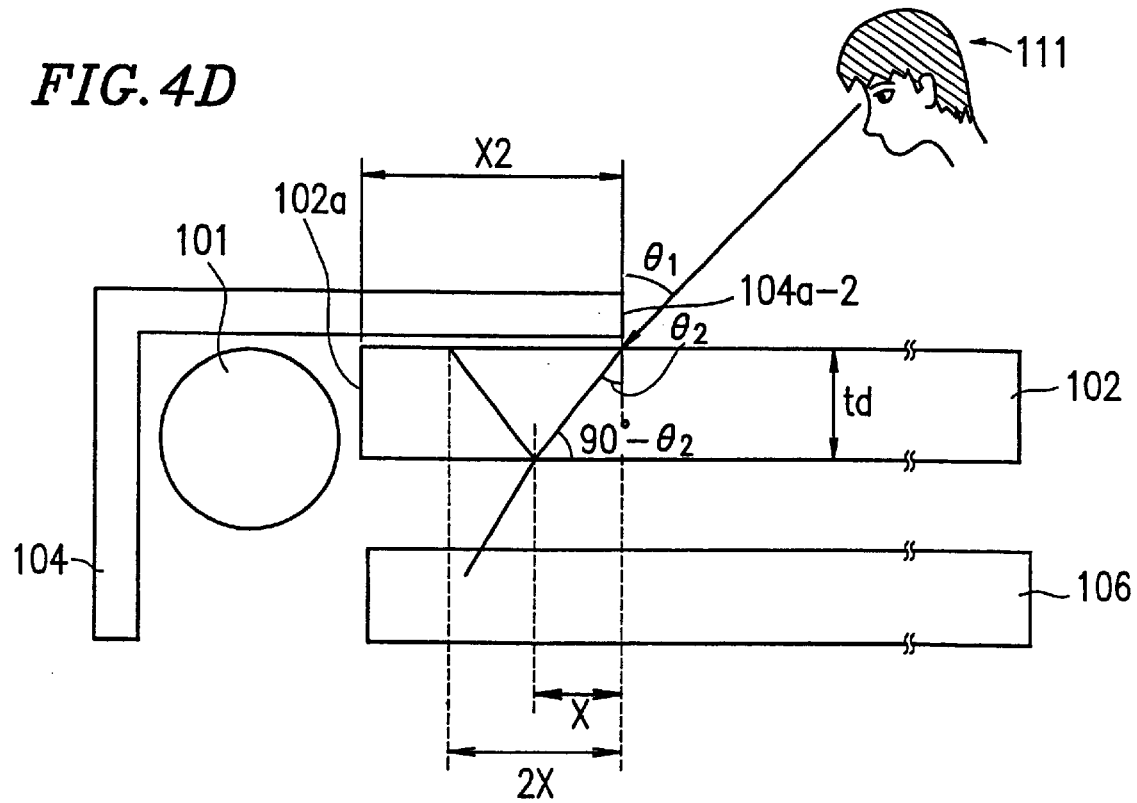
FIG. 4D is a cross-sectional view showing a structure of the liquid crystal display apparatus at a side thereof in which the light source is provided, and illustrating a geographical relationship between the cover and the light guide.

Referring to FIG. 4D, also in the case where a front light having no optical film is employed, at a side in which a light source is not provided, if distance X2 between the end face 104a-2 of the window 104a and the end face 10a of the light guide 102, is larger than 2X (herein, 0.96 mm), unnecessary light is prevented from reaching the viewer's eye.

In the present embodiment, referring to FIGS. 4A and 4C, distance X1 between the end face 104a-1 of the window 104a and the end face 102c of the light guide 102 is set to be equal to or more than distance X (e.g., set to 1.3 mm), and distance X3 between the end face 104a-1 of the window 104a and the end face 105a of the optical film 105 is set to a value equal to or more than distance X' (e.g., set to 0.8 mm). With such an arrangement, unnecessary light reflected by the light guide 102 or the optical film 105 can be prevented from reaching the viewer's eye, whereby the display quality is improved.

Figure 10A:
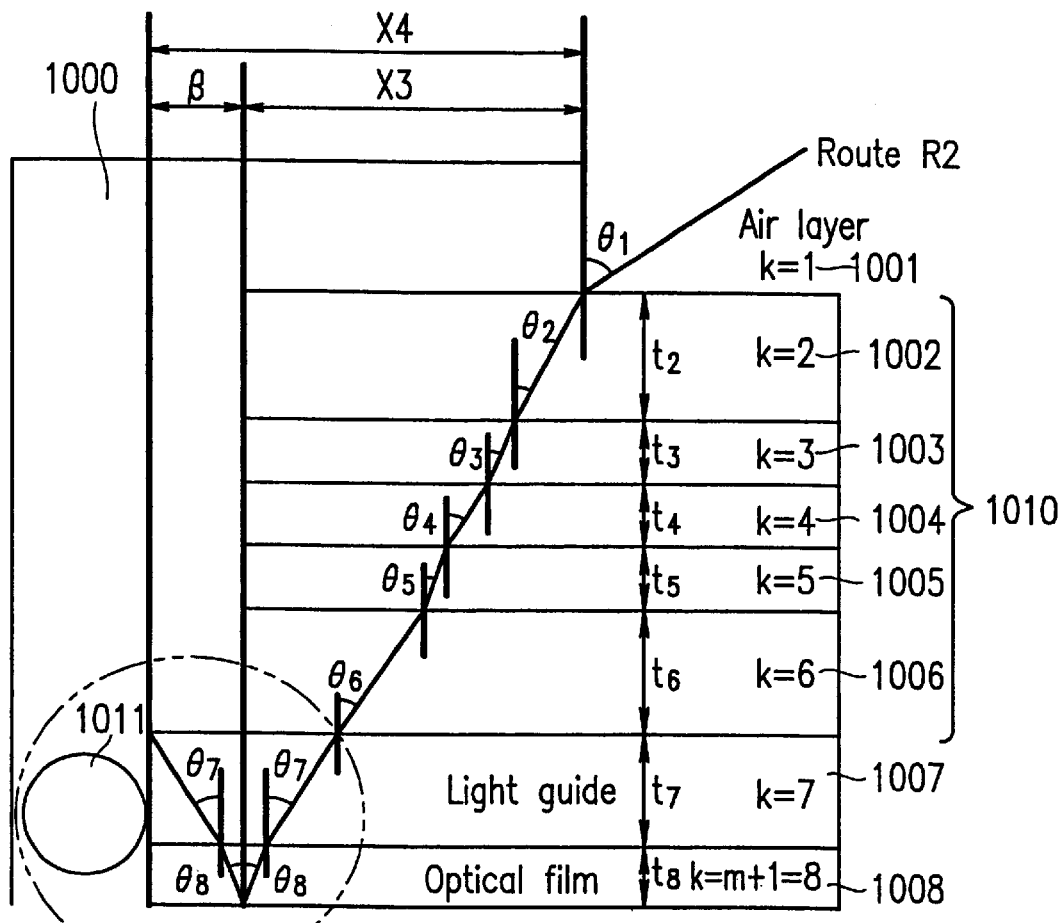
FIG. 10A shows an exemplary arrangement of the liquid crystal display apparatus in which a touch panel is provided at a viewer's side of the light guide. Herein, a relationship between an end face of the optical film and an end face of a window formed in a case, at a side in which a light source is provided, is shown.
Figure 10B:
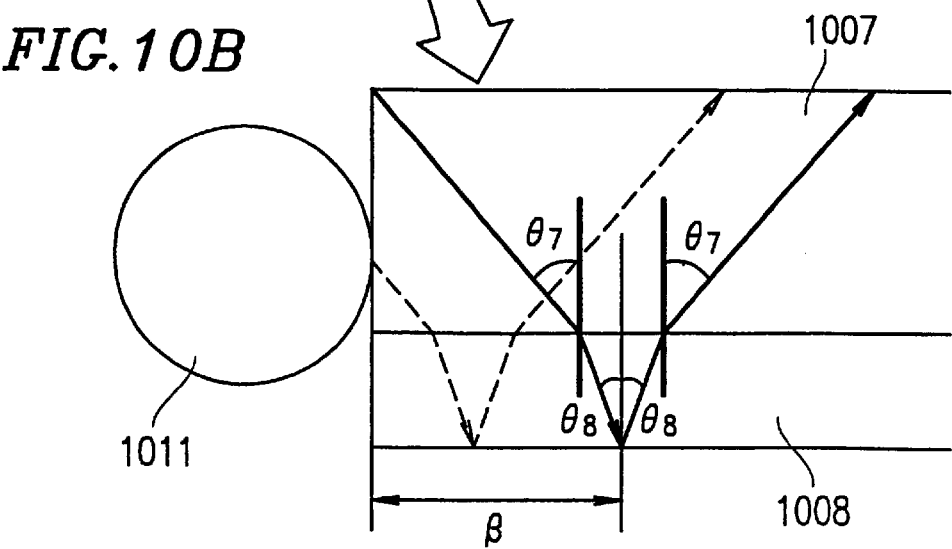
FIG. 10B is a partially enlarged view of FIG. 10A.
Figure 11A:
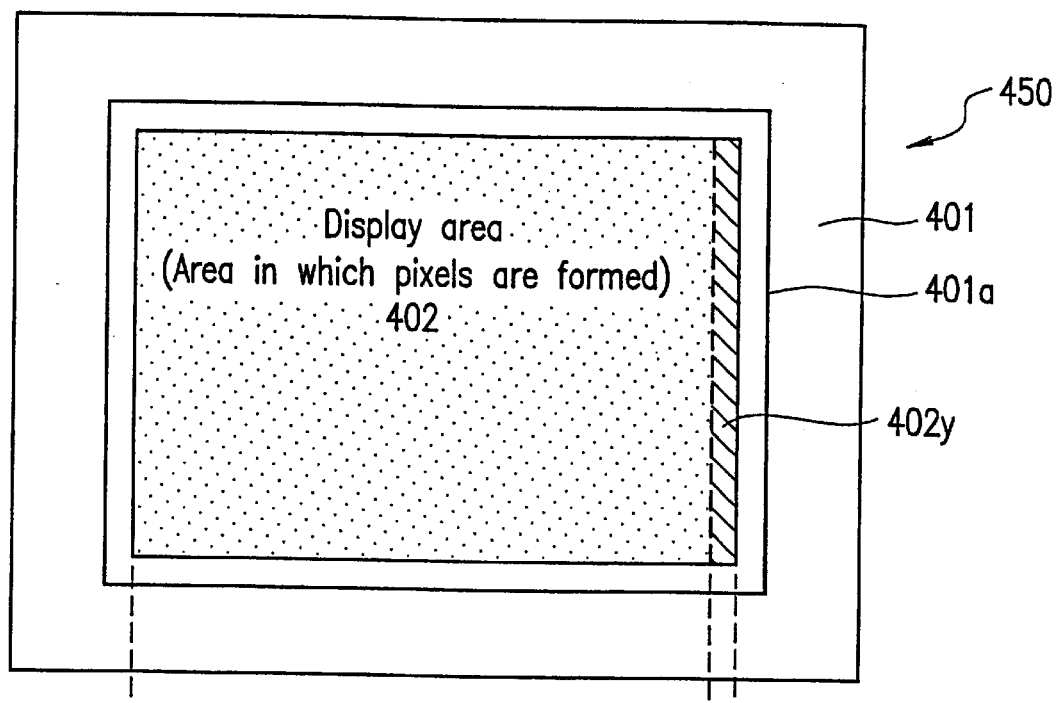
FIG. 11A is a plan view showing a conventional reflective type liquid crystal display apparatus.
Figure 11B:
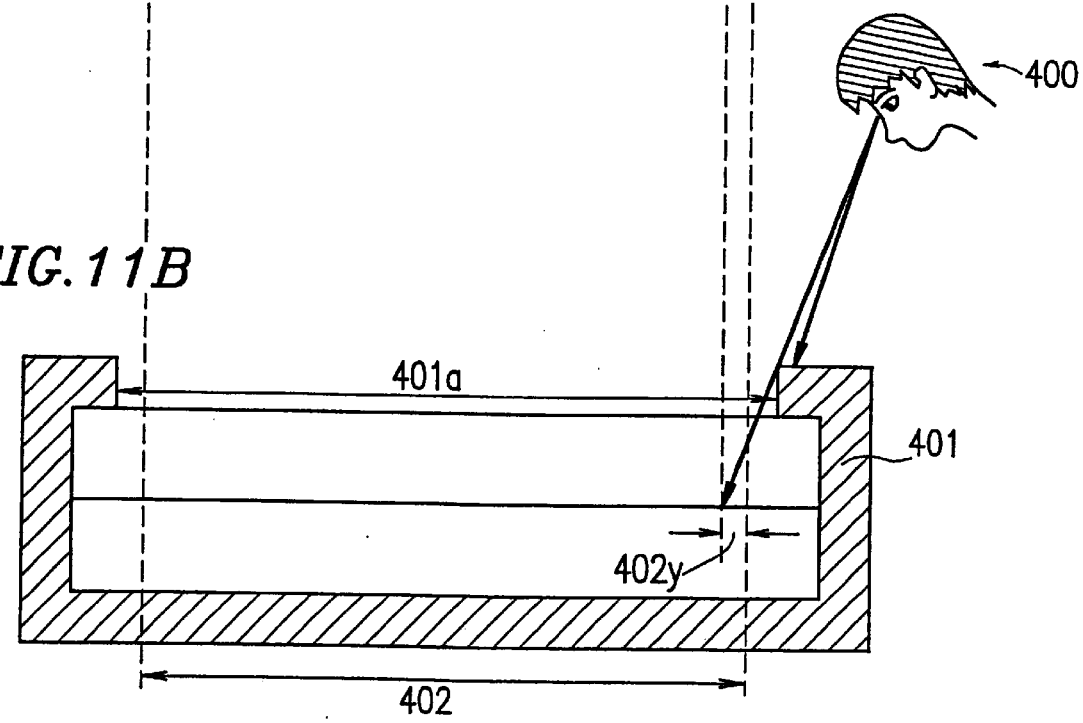
FIG. 11B is a cross-sectional view of the reflective type liquid crystal display apparatus shown in FIG. 11B.

On the other hand, at the side in which the light source 101 is provided as shown in FIG. 4B, under the same condition as those set in FIG. 4A, the intensity of light emitted from the light source 101 is greater than that at the side in which the light source 101 is not provided. Therefore, it is preferable that an end face 102a of the light guide 102 is set such that distance X4 between an end face 104a-2 of the window 104 and an end face 105b of the optical film 105 is greater than a distance in which unnecessary light reflected by the light guide 102 and the optical film 105 can be prevented from reaching the viewer's eye (i.e., distance X' plus distance β (FIG. 10B)).

Considering the reflection of light by the optical film 105, since $nd×\sin \theta_2=nk×\sin \theta_3$, the viewer 111 observes a position on the upper face of the light guide 102, which is horizontally an additional distance X" from an observed position on the upper surface of the light guide 102 as calculated as follows:

$$X''=X'+tk/(\tan(90°-\theta_3))$$

$$=0.92 \text{ mm}.$$

According to the present invention, distance X4 between the end face 104a-2 of the window 104a and the end face 105b of the optical film 105 is set to a value greater than 0.92 mm (e.g., 1.50 mm), whereby unnecessary reflected light can be prevented from reaching the viewer's eye, and the display quality is improved, accordingly.

Furthermore, considering unnecessary light reflected by the optical film 105 and transmitted through the light guide 102, since $$nd×\sin \theta_2=nk×\sin \theta_3,$$

the viewer 111 observes a position on the upper face of the light guide 102, which is horizontally an additional distance X''' from the observed position on the upper face of the light guide 102 as calculated as follows:

$$X'''=X''+x$$

$$=1.40 \text{ mm}.$$

Thus, according to the present embodiment, distance X2 between the end faces 104a-2 of the window 104a and the end face 102a of the light guide 102 is set to be greater than 1.40 mm. In such an arrangement, unnecessary reflected light, which is not interrupted by the case 104, is prevented from reaching the viewer's eye, whereby the display quality can be improved. That is, at the side of the front light 110 in which the light source 101 is provided, distance X2 between the end face 104a-2 of the window 104a formed in the case (protection member) 104 and the end face 102a of the light guide 102 is determined so that light which is emitted from the light source 101 and reflected by the under face of the light guide 102 is not observed by the viewer 111 who is gazing at the display screen in a direction within a desirable viewing angle range, whereby the undesirable reflected light can be prevented from reaching the viewer's eye.

Furthermore, at the side in which the light source 101 is not provided as shown in FIG. 4A, distance X1 between the end face 104a-1 of the window and the endface 102a of the light guide 102 is set to 1.30 mm. At the side in which the light source 101 is provided as shown in FIG. 4B, distance X2 between the end face 104a-2 of the window and the end face 102a of the light guide 102 is set to 2.0 mm. In such a structure, light leaking from the end faces 102a and 102c and light which is emitted from the light source 101 and reflected by the lower face of the light guide 102 can be prevented from reaching the viewer's eye.

In present embodiment, the case 104, the light guide 102, and the optical film 105 are positioned so that distances X1 and X2 are larger than distances X3 and X4, respectively. However, even in the case where X1 is equal to X3, or X2 is equal to X4, an optical problem does not occur as long as they are equal to or greater than distance X' or X''', respectively. This is because only a distance between the end face 104a-1 or 104a-2 of the case 104 and an end face of the lowest layer of the front light 110 (e.g., the light guide 102 of the FIGS. 4C, 4D, or the optical film 105 of the FIGS. 4A, 4B) need to be considered in order to prevent light leakage.

However, in the case where an optical film is adhered to the light guide, if the optical film is larger than the light guide, a peripheral portion of the film may be peeled off due to its adhesion accuracy. In the present embodiment, the optical film is attached to the light guide via an adhesive layer (not shown), and the size of the optical film is formed in a size smaller than that of the light guide in order to prevent the optical film from being peeled off in the peripheral portion thereof. Herein, the adhesion accuracy of the optical film is about ±0.5 mm with respect to a reference position. Even if the molding accuracy of the light guide is considered, the size of the light guide becomes larger only by several millimeters with respect to the end face of the optical film. Such an increased size is completely covered within a mounting area of the liquid crystal panel. Therefore, the portability of the liquid crystal display equipment is not spoiled.

The values shown above are exemplary values in a configuration wherein an optical film is positioned on the lower face of the light guide. On the other hand, in a configuration wherein an optical film is not provided on the lower face of the light guide, as shown in FIG. 4C, a front light is positioned so that distance X1 is greater than distance X at a side thereof in which the light source is not provided. On the other hand, at a side in which the light source is provided, as shown in FIG. 4D, the front light is positioned so that distance X2 is equal to or greater than distance X plus distance a (FIG. 9A) (in this case, X plus α=2×X), in which distance a is provided for preventing light reflected by the light guide 102 from reaching the viewer's eye.

Next, the change in the polarization state of light in the case of employing an optical film composed of a polarizing plate and a quarter-wave plate will be described.

Figure 5:
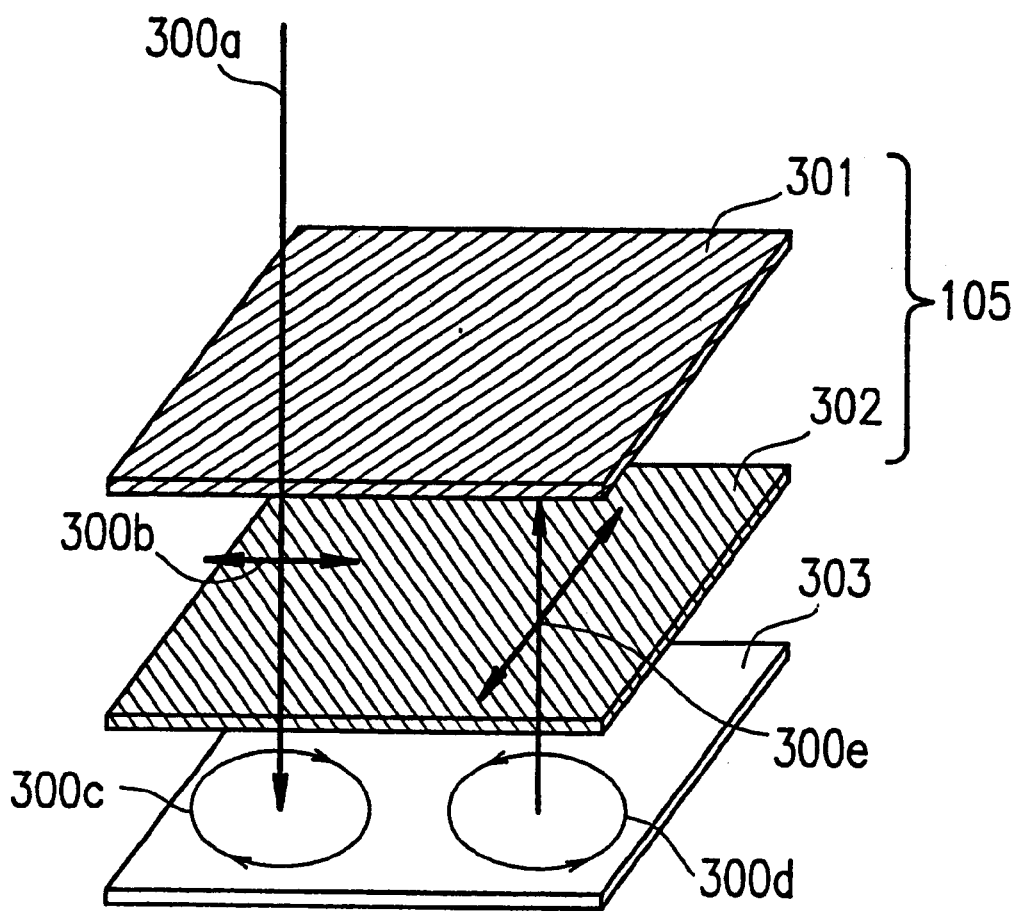
FIG. 5 is a perspective view showing a change in the state of light which transmits through the optical film composed of a polarizing plate and a quarter-wave plate.

In an example shown in FIG. 5, an optical film 105 to be placed on the emission face side of the light guide 102 (FIGS. 4A and 4B) is composed of, from the viewer's side, a polarizing plate 301 and a quarter-wave plate 302. The polarizing plate 301 and the quarter-wave plate 302 are combined such that a slow axis (or a fast axis) of the quarter-wave plate 302 makes an angle of about 45° with a transmission axis (or an absorption axis) of the polarizing plate 301.

In the case where light from the light guide 102 or ambient light reaches the optical film 105, the incident light 300a is transmitted through the polarizing plate 301 to be converted into linearly polarized light 300b which has an uniform polarization state. The linearly polarized light 300b enters the quarter-wave plate 302 and is converted into a circularly polarized light 300c.

In general, the circularly polarized light 300c enters the liquid crystal display device and is modulated for displaying images. However, about a 4% of circularly polarized light 300c is reflected by a surface of a counter glass substrate 303 which is placed on the viewer's side of the liquid crystal display device. The reflected light 300d is unnecessary light which does not contribute for displaying images, and is a cause for deterioration of the display contrast.

However, with the configuration of the polarizing plate 301 and the quarter-wave plate 302 as shown in FIG. 5, the circularly polarized light 300d which has been reflected by the surface of the counter glass substrate 303 is converted into circularly polarized light whose phase has been modulated by 180°. Then, the 180°-modulated circularly polarized light 300d is converted by the quarter-wave plate 302 into linearly polarized light 300e which crosses the transmission axis of the polarizing plate 301 with an angle of 90°. As a result, unnecessary reflected light is removed by the polarizing plate 301, whereby a reflective type liquid crystal display apparatus in which the contrast does not deteriorate can be obtained.

Furthermore, as shown in FIG. 2, in the case where a half-wave plate is inserted between a polarizing plate and a quarter-wave plate of an optical film as described in the present example, the tolerance of the phase delay with respect to the wavelength of the light is compensated for, whereby a circularly polarized state of light can be maintained. As a result, an anti-reflection effect against unnecessary reflected light can be further improved.

Furthermore, light leakage from end faces of the optical film which can be found when the liquid crystal display device is observed in an oblique direction, i.e., reflected light which appears around the optical film due to reflected light by the optical film in the direction of the thickness thereof or due to insufficient compensation of the phase, can be prevented by setting distances X3 and X4 to be within the above-described ranges, respectively.

Table 1 shows relationships between respective viewing angle ranges and minimum values of distances X1, X2, X3, and X4 for preventing light leakage. Distances X1 and X2 each correspond to a structure having no optical film on an emission face of the light guide, while distances X3 and X4 each correspond to a structure having an optical film on the emission face of the light guide.

TABLE 1

Relationship between viewing angle range & distances X1, X2, X3, and X4 (lower limit)

| Viewing angle range | Front light without optical film | | Front light with optical film | |
| --- | --- | --- | --- | --- |
| (deg) | X1 (mm) | X2 (mm) | X3 (mm) | X4 (mm) |
| 0 | 0.00 | 0.00 | 0.00 | 0.00 |
| 10 | 0.12 | 0.23 | 0.17 | 0.34 |
| 20 | 0.24 | 0.47 | 0.34 | 0.68 |
| 30 | 0.36 | 0.71 | 0.52 | 1.04 |
| 40 | 0.48 | 0.96 | 0.70 | 1.40 |
| 50 | 0.60 | 1.20 | 0.89 | 1.77 |
| 60 | 0.71 | 1.43 | 1.07 | 2.13 |
| 70 | 0.81 | 1.63 | 1.23 | 2.46 |
| 80 | 0.88 | 1.76 | 1.34 | 2.69 |

Viewing angle range in TABLE 1 is half of an actual viewing angle range.
Light guide: Thickness td = 1.0 mm
Refractive index nd = 1.49
Optical film: Thickness tk = 0.45 mm
Refractive index nk = 1.50

Distances X1, X2, X3, and X4 each may be set to a value equal to or greater than a value shown in table 1, according to each viewing angle range which is required by the liquid crystal display apparatus.

Furthermore, in the case where there is an input/output device such as a touch panel or the like, or any other component, an air layer, an adhesive layer, etc., at the viewer side of the front light, the position of the end face of the light guide or the end face of the optical film should be determined in consideration of the thickness and the refractive index thereof.

Figure 6:
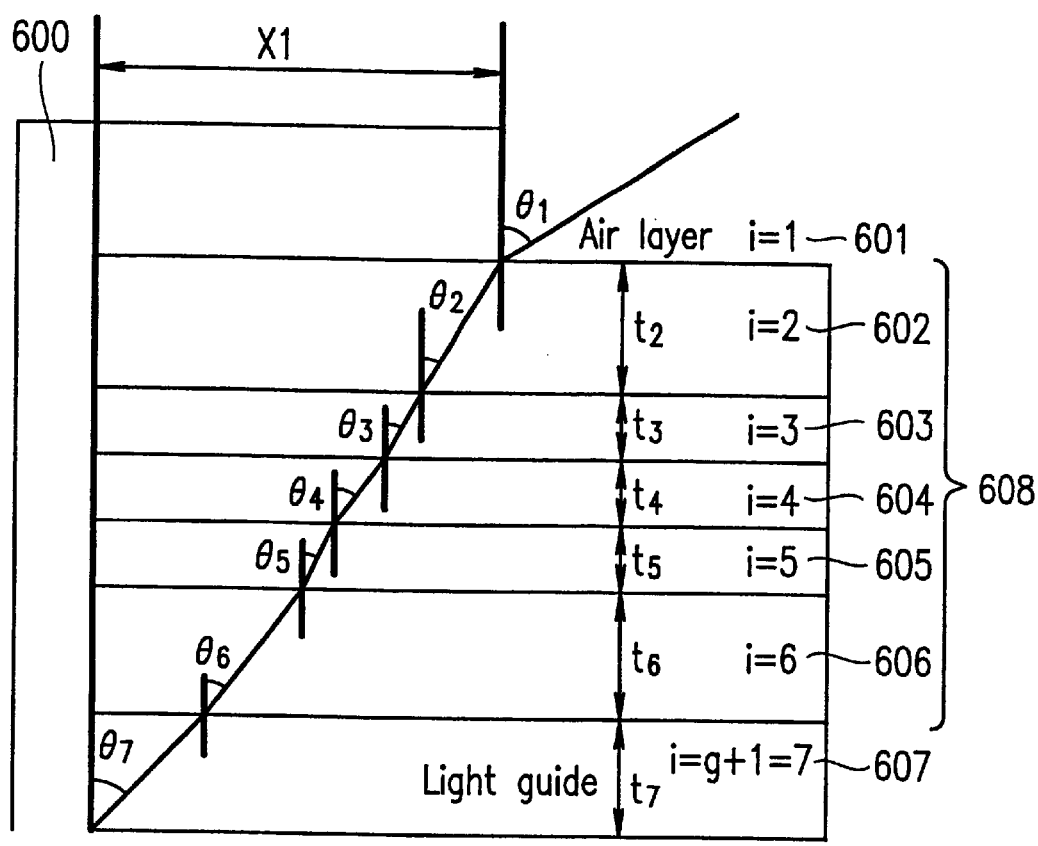
FIG. 6 shows an exemplary arrangement of the liquid crystal display apparatus in which a touch panel is provided at the viewer's side of the light guide. Herein, a relationship between an end face of the light guide and the end face of the window formed in the case, at a side in which the light source is not provided, is schematically shown.

For example, FIG. 6 shows an exemplary arrangement in which a touch panel 608 is provided at the viewer's side of the light guide 607. The touch panel 608 is composed of, from the viewer's side, a PET film 602, a transparent electrode 603, an air layer 604, a transparent electrode 605, and a glass substrate 606, and serves as an input/output device that converts a change of the electrical resistance or the electrical capacity of transparent electrodes 603 and 605 (provided respective sides of the air layer 604) between the contact state and the non-contact state into an electric signal. In FIG. 6, reference numeral 600 denotes a case, 601 denotes an air layer on the front side of the touch panel 608, and 607 denotes a light guide.

In this structure, light incident from the direction of maximum viewing angle $\theta_1$ (light incident from the air layer 601 (1st layer (i=1)) is refracted by the PET film 602 (2nd layer [i=2]), and further refracted by the transparent electrode 603 (3rd layer [i=3]). Furthermore, the light is refracted according to the Snell's law to reach an end face of the light guide 607 ((g+1)th layer: 7th layer in this example). While traveling from the upper face of the PET film 602 to the lower face of the light guide 607, the light shifts by distance X1 in the horizontal direction. Therefore, a component of light which leaks at the end face of the light guide 607 may travel through the same route as that of the incident light but in the opposite direction, and goes out from the upper face of the PET film 602 in the direction of maximum viewing angle $\theta_1$.

Thus, in the case where an input/output device such as a touch panel or a member such as a protecting plate is provided on the front face (viewer's side) of a light guide, distance X1 between an end face of the window of the case and an end face of the light guide should be determined in consideration of the thickness and the refractive index of each layer.

Furthermore, in the case where an optical film is provided on the lower face of the light guide, distance X1 should be determined in consideration of the thickness and refractive index of the optical film.

Figure 7:
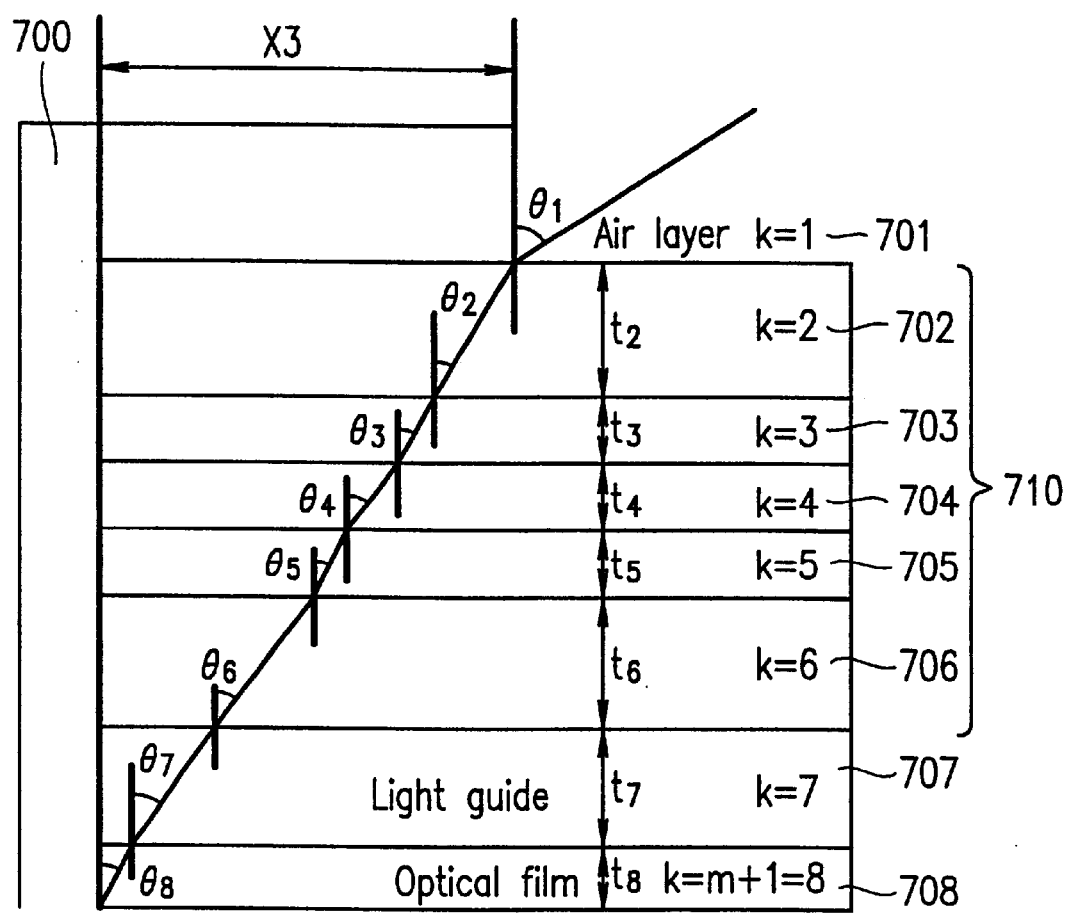
FIG. 7 shows an exemplary arrangement of the liquid crystal display apparatus in which a touch panel is provided at the viewer is side of the light guide, and an optical film is provided on the lower face of the light guide. Herein, a relationship between the end face of the window formed in the case and an end face of the optical film, at a side of the display apparatus in which the light a source is not provided, is schematically shown.

For example, FIG. 7 shows an exemplary arrangement in which a touch panel 710 is provided at the viewer's side of the light guide 707, and an optical film 708 is provided on the lower face of the light guide 707. The touch panel 710 is composed of, from the viewer's side, a PET film 702, a transparent electrode 703, an air layer 704, a transparent electrode 705, and a glass substrate 706. In FIG. 7, reference numeral 700 denotes a case, 701 denotes an air layer on the front side of the touch panel 710, and 707 denotes a light guide.

In this structure, light incident from the direction of maximum viewing angle $\theta_1$ (light incident from the air layer 701 (1st layer [k=1]) is refracted by layers from the PET film 702 to the optical film 708 according to the Snell's law while traveling through these layers, reaching an end face of the optical film 708 ((m+1)th layer: 8th layer in this example). While traveling from the upper face of the PET film 702 to the lower face of the optical film 708, the light shifts by distance X3 in the horizontal direction. Therefore, a component of light which leaks at the end face of the optical film 708 may travel through the same route as that of the incident light but in the opposite direction, and goes out from the upper face of the PET film 702 in the direction of maximum viewing angle $\theta_1$.

Thus, in the case where the optical film 708 is provided on the lower surface of the light guide 707, the thickness and the refractive index of the optical film 708 ((m+1)th layer) is further considered to determine distance X3 between the end face of the window of the case 700 and the end face of the optical film 708.

This applies to distances X2 and X4 between an end face of the window of the case and an end face of the light guide or an end face of the optical film at the side of the front light in which the light source is provided, except that the reflection of light emitted from the light source should be considered.

Regarding the above-described touch panel, in the case where the transparent electrode 603, the transparent electrode 605, or the air layer 604 is very thin, for example, in the case where each of these layers is as thin as an interference film, the refractive index or the thickness of such a film is negligible.

The present invention is not limited to the numeric values shown above. These values may be changed in accordance with the change in the thickness or the refractive index of the light guide or the optical film. Furthermore, in the case where an input/output device (touch panel or the like), protecting plate, etc., are provided to the viewer's side of the light guide, the thickness and the refractive index thereof should be considered to determine a distance between an end face of a window formed in the case and a corresponding end face of the light guide or the optical film.

Furthermore, in the case where a screen of the display apparatus is not square, if the screen size becomes large, or when an aspect ratio (a ratio between a vertical length and a horizontal length) becomes large, a perspective angle may be considerably different between the vertical direction and the horizontal direction. In such a case, the distance between the end face of the window of the case and the end face of the light guide or the optical film may be set separately in the vertical direction and the horizontal direction to different values.

In the present embodiment, the optical film is a film composed of a polarizing plate, a half-wave plate, and a quarter-wave plate, but is not limited thereto. A film composed of a polarizing plate and a quarter-wave plate may be alternatively used. In this case also, unnecessary light reflected by a surface of a counter glass substrate of the liquid crystal display device is removed by the polarizing plate and the quarter-wave plate, whereby the contrast of the display can be improved.

Furthermore, the optical film may be an anti-reflection film. For example, an anti-reflection film composed of a TAC (triacetylcellulose) film and a dielectric thin film formed thereon, in which a reflection energy is reduced by an interference effect of the thin film. More specifically, on a TAC film, $MgF_2$ (refractive index: 1.38, thickness: 100 nm) for the first layer, $CeF_3$ (refractive index: 2.30, thickness: 120 nm) for the second layer, $TiO_2$ (refractive index: 1.63, thickness: 120 nm) for the third layer, and $MgF_2$ (refractive index: 1.38, thickness: 100 nm) for the fourth layer are formed by the vacuum evaporation method, thereby fabricating an anti-reflection film which is effective for a wavelength within a broadband. The thickness of this anti-reflection film is 0.11 mm, and the refractive index thereof is 1.50.

The material of the light guide is not limited to that described in the present embodiment. The light guide of the present invention may be made of a transparent resin, glass, or the like, by a processing method such as injection molding or the like. The transparent resin may include acrylic resins (polymethylmethacrylate, etc.), polycarbonate resins, epoxy resins, etc.

Furthermore, in the present embodiment, the cyclic structure formed on the upper face (viewer's side) of the light guide consists of a plurality of prisms. Each portion of the cyclic structure is not limited to a prism, but may have a trapezoidal shape, a lenticular shape, a spherical shape, or any other convex/concave shape.

In the present embodiment, a 3.9" reflective type liquid crystal display device is employed, and a viewing angle range up to 40° is considered to determine ok distances X1 and X2 between the end face of the window formed in the protection member (case) and the end face of the light guide, and to determine distances X3 and X4 between the end face of the window formed in the protection member and the end face of the optical film. However, the present invention is not limited to the values shown in the present embodiment. For example, in a front light having no optical film, distance X1 may be set to be within the following range:

$$0 \leq X1 \leq \sum_{i=1}^{g} (t_{i+1}/\tan(90° - \sin^{-1}((n_i/n_{i+1})X\sin\theta_i)))$$

(where, in the air layer of the window (i=1), $n_1=1.00$ and $\theta_1=80°$), and distance X2 may be set to be within the following range:

$$0 \leq X2 \leq \left\{\sum_{i=1}^{g} (t_{i+1}/\tan(90° - \sin^{-1}((n_i/n_{i+1})X\sin\theta_i)))\right\} + (t_{g+1}/\tan(90° - \sin^{-1}((n_g/n_{g+1})X\sin\theta_g)))$$

On the other hand, in a front light having an optical film, distance X3 may be set to be within the following range:

$$0 \leq X3 \leq \sum_{k=1}^{m} (t_{k+1}/\tan(90° - \sin^{-1}((n_k/n_{k+1})X\sin\theta_k)))$$

(where, in the air layer of the window [k=1], $n_1=1.00$ and $\theta_1=800$), and distance X4 may be set to be within the following range:

$$0 \leq X4 \leq \left\{\sum_{k=1}^{m} (t_{k+1}/\tan(90° - \sin^{-1}((n_k/n_{k+1})X\sin\theta_k)))\right\} + (t_m/\tan(90° - \sin^{-1}((n_{m-1}/n_m)X\sin\theta_{m-1}))) + (t_{m+1}/\tan(90° - \sin^{-1}((n_m/n_{m+1})X\sin\theta_m)))$$

For example, in a liquid crystal display device for a large-size screen apparatus which requires a wide viewing angle range, the upper limit of the viewing angle range of the liquid crystal display device, i.e., 80°, is considered to determine the distances X1, X2, X3, and X4, in order to prevent unnecessary light leakage. In a liquid crystal display device for a small-size screen apparatus which requires a smaller viewing angle range relative to the large-size screen apparatus, unnecessary light leakage can be prevented as long as the lower limit of the viewing angle range is greater than 0°.

As described hereinabove, according to the present invention, at a side of the front light in which the light source is not provided, an end face of a window formed in a protection member (case) is positioned with respect to the light guide such that light incident in a direction within a desirable viewing angle range passes through a lower face of the light guide, whereby light leakage from the end face of the light guide can be prevented.

Specifically, distance X1 between the end face of the window formed in the protection member and the end face of the light guide is set to be within the following range:

$$0 \leq X1 \leq \sum_{i=1}^{g} (t_{i+1}/\tan(90° - \sin^{-1}((n_i/n_{i+1})X\sin\theta_i)))$$

(where, in the first layer (i=1), $\theta_1$ is a maximum angle within a desirable viewing angle range), whereby a reflective type liquid crystal display apparatus having a superior display quality can be obtained without spoiling the portability thereof. Preferably, in the first layer(an air layer in the window (i=1), $n_i$=1.00, $\theta_1$ is preferably 80°, and $$\sum_{i=1}^{g}(t_{i+1}/\tan(90°-\sin^{-1}((n_i/n_{i+1})X\sin\varphi_i))) \leq$$

$$X1 \leq \sum_{i=1}^{g}(t_{i+1}/\tan(90°-\sin^{-1}((n_i/n_{i+1})X\sin\theta_i)))$$

(where, in the first layer (i=1), $\phi_1$ is a desirable perspective angle). Preferably, the perspective angle is smaller than 4°.

Furthermore, it is preferable that an optical film is provided on a large face of the light guide which faces. the liquid crystal display device. In such a case, at a side in which the light source is not provided, distance X3 between the end face of the window formed in the protection member and an end face of the optical film is within the following range:

$$0 \leq X3 \leq \sum_{k=1}^{m}(t_{k+1}/\tan(90°-\sin^{-1}((n_k/n_{k+1})X\sin\theta_k)))$$

(where, in the first layer (k=1), $\theta_1$ is a maximum angle within a desirable viewing angle range). Preferably, in the first layer (k=1), $n_1$=1.00, and $\theta_1$ is 80°. With such an arrangement, over the viewing angle range from 00° (lower limit) to 80° (upper limit), reflected light which occurs in the direction of the thickness of the optical film and reflected light due to insufficient compensation of a phase by the optical film can be prevented. Therefore, a reflective type liquid crystal display apparatus having a superior display quality can be obtained. Preferably, an end portion of the optical film is covered with the protection member so that distance X3 is within the following range:

$$\sum_{k=1}^{m}(t_{k+1}/\tan(90°-\sin^{-1}((n_k/n_{k+1})X\sin\varphi_k))) \leq$$

$$X3 \leq \sum_{k=1}^{m}(t_{k+1}/\tan(90°-\sin^{-1}((n_k/n_{k+1})X\sin\theta_k)))$$

(where, in the air layer (k=1) of the window, $\phi_1$ is a desirable perspective angle). Preferably, the perspective angle is smaller than 4°.

Alternatively, at a side in which the light source is provided, an end face of the window formed in the protection member is positioned with respect to the light guide so that light emitted from the light source and reflected by the lower face of the front light is not observed in a direction within the desirable viewing angle range. Thus, the unnecessary reflected light can be prevented from reaching the viewer's eye.

Specifically, the end portion of the light guide is covered with a protection member such that distance X2 between the end face of the window formed in the protection member and the end face of the light guide is within the following range:

$$0 \leq X2 \leq \left\{\sum_{i=1}^{g}(t_{i+1}/\tan(90°-\sin^{-1}((n_i/n_{i+1})X\sin\theta_i)))\right\} +$$

$$(t_{g+1}/\tan(90°-\sin^{-1}((n_g/n_{g+1})X\sin\theta_g)))$$

(where, in the first layer (i=1), $\theta_1$ is a maximum angle within a desirable viewing angle range), whereby a reflective liquid crystal display apparatus having a superior display quality can be obtained without spoiling the portability thereof.

Preferably, $\theta_1$ is set to 80°, whereby light leakage from the end face of the light guide can be prevented over the viewing angle range from 0° (lower limit) to 800° (upper limit).

Furthermore, it is preferable that, at the side in which the light source is provided, the end portion of the light guide is covered with the protection member so that distance X2 between the end face of the window and the end face of the light guide is set, in accordance with a viewing angle range required for the liquid crystal display device, to be within the following range:

$$\sum_{j=1}^{g}(t_{i+1}/\tan(90°-\sin^{-1}((n_i/n_{i+1})X\sin\varphi_i))) +$$

$$(t_{g+1}/\tan(90°-\sin^{-1}((n_g/n_{g+1})X\sin\varphi_g))) \leq$$

$$X2 \leq \left\{\sum_{i=1}^{g}(t_{i+1}/\tan(90°-\sin^{-1}((n_i/n_{i+1})X\sin\theta_i)))\right\} +$$

$$(t_{g+1}/\tan(90°-\sin^{-1}((n_g/n_{g+1})X\sin\theta_g)))$$

(where, in the air layer of the window (k=1), $\phi_1$ is a required perspective angle).

The reflective type liquid crystal display apparatus may further include an optical film. In such a case, it is preferable that, at a side in which the light source is provided, the end portion of optical film is covered with the protection member such that distance X4 between the end face of the window formed in the protection member and the end face of the optical film is within the following range:

$$0 \leq X4 \leq \left\{\sum_{k=1}^{m}(t_{k+1}/\tan(90°-\sin^{-1}((n_k/n_{k+1})X\sin\theta_k)))\right\} +$$

$$(t_m/\tan(90°-\sin^{-1}((n_{m-1}/n_m)X\sin\theta_{m-1}))) +$$

$$(t_{m+1}/\tan(90°-\sin^{-1}((n_m/n_{m+1})X\sin\theta_m)))$$

(where, in the first layer (k=1), $\theta_1$ is within adesirable perspective angle range). Preferably, $\theta_1$ is set to 80°, whereby light leakage from the end face of the optical film can be prevented over the viewing angle range from 0° (lower limit) to 800° (upper limit). In addition, light emitted from the light source and reflected by the optical film can be prevented from reaching the viewer's eye. Thus, a reflective liquid crystal display apparatus having a superior display quality can be obtained.

Furthermore, it is preferable that, at the side in which the light source is provided, the end portion of the optical film is covered with the protection member so that distance X4 between the end face of the window and the end face of the optical film is set, in accordance with a viewing angle range required for the liquid crystal display device, to be within the following range:

$$\sum_{k=1}^{m}(t_{k+1}/\tan(90°-\sin^{-1}((n_k/n_{k+1})X\sin\varphi_k))) +$$

$$(t_m/\tan(90°-\sin^{-1}((n_{m-1}/n_m)X\sin\varphi_{m-1}))) +$$

$$(t_{m+1}/\tan(90°-\sin^{-1}((n_m/n_{m+1})X\sin\varphi_m))) \leq$$

$$X4 \leq \left\{\sum_{k=1}^{m}(t_{k+1}/\tan(90°-\sin^{-1}((n_k/n_{k+1})X\sin\theta_k)))\right\} +$$

$$(t_m/\tan(90°-\sin^{-1}((n_{m-1}/n_m)X\sin\theta_{m-1}))) +$$

$$(t_{m+1}/\tan(90°-\sin^{-1}((n_m/n_{m+1})X\sin\theta_m)))$$

(where, in the air layer of the window (k=1), $\phi_1$ is a required perspective angle).

In the case where an anti-reflection film is employed as the optical film, interference of light emitted from the light source and light reflected by an emission surface of the light guide can be prevented, and light leakage from an end face of the optical film can be prevented. Thus, a reflective liquid crystal display apparatus having a superior display quality can be obtained.

In the case where a film composed of a polarizing plate and a quarter-wave plate is employed as the optical film, unnecessary light reflected by the quarter-wave plate or by a surface of a counter glass substrate is removed, whereby contrast deterioration can be prevented. In addition, light leakage from the end face of the optical film can be prevented. Thus, a reflective liquid crystal display apparatus having a superior display quality can be obtained.

Alternatively, in the case where a film composed of a polarizing plate, a half-wave plate, and a quarter-wave plate is employed as the optical film, the tolerance of the phase delay with respect to the wavelength of the light is compensated for, whereby a circularly polarized state of light can be maintained. As a result, unnecessary light reflected by the quarter-wave plate or by a surface of a counter glass substrate can be further prevented. Thus, a reflective liquid crystal display apparatus having a superior display quality can be obtained.

Furthermore, by employing the reflective type liquid crystal display apparatus according to the present invention which has a superior display quality and a high portability, a small and highly-portable electronic information equipment of low power consumption can be realized.

Various other modifications will be apparent to and can be readily made by those skilled in the art without departing from the scope and spirit of this invention. Accordingly, it Is not intended that the scope of the claims appended hereto be limited to the description as set forth herein, but rather that the claims be broadly construed.

What is claimed is:

1. A reflective type liquid crystal display apparatus, comprising:
   a reflective type liquid crystal display device for displaying images by reflecting incident light in such a manner that the incident light is separately controlled for each pixel;
   a front light positioned at a front face side of the reflective type liquid crystal display device, the front light including a light source and a light guide, wherein light emitted from the light source enters the light guide from an end face thereof near the light source, and the light is output from a large face of the light guide which faces the liquid crystal display device; and
   a protection member for covering at least part of the reflective type liquid crystal display device and at least part of the front light, wherein a window is formed in the protection member at a front face side of the front light for a viewer to observe the images displayed on the reflective type liquid crystal display device,
   wherein, at a side of the front light in which the light source is not provided, a distance between an end face of the window formed in the protection member and an end face of the light guide adjacent thereto is determined so that the end face of the window is laterally offset from the end face of the light guide and is closer to a central portion of a display area than is the end face of the light guide; and
   wherein the front light further comprises an optical film provided on the large face of the light guide which faces the liquid crystal display device, and wherein a two dimensional area defined by the optical film is greater than a two dimensional area defined by the window formed in the protection member, but less than a two dimensional area defined by the light guide, so that at least a portion of a peripheral edge of the optical film is located between the end face of the window and the end face of the light guide as viewed from a front of the display apparatus.

2. A reflective type liquid crystal display apparatus according to claim 1, wherein:
   at a side in which the light source is not provided, the protection member covers an end portion of the optical film such that distance X3 between an end face of the window and an end face of the optical film is within the following range:

$$0 \leq X3 \leq \sum_{k=1}^{m}(t_{k+1}/\tan(90° - \sin^{-1}((n_k/n_{k+1})X\sin\theta_k)))$$

(where $t_{k+1}$ is a thickness of the (k+1)th layer; $n_k$ and $n_{k+1}$ are refractive indices of the k-th layer and the (k+1)th layer, respectively; angle $\theta_k$ is an angle between a direction of light incident on the k-th layer and a direction perpendicular to the front light; the angle $\theta_1$ in the $1^{st}$ layer is a maximum angle within a desirable viewing angle range; and the relationship $n_k \times \sin\theta_k = n_{k+1} \times \sin\theta_{k+1}$ is satisfied); and
   the front light includes m layers; the adjacent layers have different refractive indices; the m-th layer is the light guide; and the (m+1)th layer is the optical film.

3. A reflective type liquid crystal display apparatus according to claim 2 wherein, when k=1, $n_1$=1.00.

4. A reflective type liquid crystal display apparatus according to claim 2 wherein, when k=1, $\theta_1$=80°.

5. A reflective type liquid crystal display apparatus according to claim 1, wherein:
   the protection member covers an end portion of the optical film such that distance x3 between an end face of the window and an end face of the optical film is within the following range:

$$\sum_{k=1}^{m}(t_{k+1}/\tan(90° - \sin^{-1}((n_k/n_{k+1})x\sin\varphi_k))) \leq$$

$$x3 \leq \sum_{k=1}^{m}(t_{k+1}/\tan(90° - \sin^{-1}((n_k/n_{k+1})x\sin\theta_k)))$$

(where $t_{k+1}$ is a thickness of the (k+1)th layer; $n_k$ and $n_{k+1}$ are refractive indices of the k-th layer and the (k+1)th layer, respectively; angle $\theta_k$ is an angle between a direction of light incident on the k-th layer and a direction perpendicular to the front light; the angle $\theta_1$ in the $1^{st}$ layer is a maximum angle within a desirable viewing angle range; angle $\phi_k$ is an angle between a direction of light incident on the k-th layer and a direction perpendicular to the front light; the angle $\phi_1$ in the $1^{st}$ layer is a perspective angle; and the relationships $n_k \times \sin\theta_k = n_{k+1} \times \sin\theta_{k+1}$, and $n_k \times \sin\phi_k = n_{k+1} \times \sin\phi_{k+1}$ are satisfied); and
   the front light includes m layers; the adjacent layers have different refractive indices; the m-th layer is the light guide; and the (m+1)th layer is the optical film.

6. A reflective type liquid crystal display apparatus according to claim 5, wherein the perspective angle $\phi_1$ in the 1st layer (k=1) is smaller than 4°.

7. A reflective type liquid crystal display apparatus according to claim 1, wherein the optical film has an anti-reflection effect.

8. A reflective type liquid crystal display apparatus according to claim 1, wherein the optical film includes a polarizing plate and a quarter-wave plate.

9. A reflective type liquid crystal display apparatus according to claim 1, wherein the optical film includes a polarizing plate, a half-wave plate, and a quarter-wave plate.

10. Portable electronic equipment comprising the reflective type liquid crystal display apparatus of claim 1.

11. The display apparatus of claim 1, wherein, at the side of the front light in which the light source is not provided, the distance between the end face of the window and the end face of the light guide is sufficient so that light incident at an angle of 40 degrees passes through a lower face of the light guide.

12. The display apparatus of claim 1, wherein the end face of the window is laterally offset from the end face of the light guide and is closer to a central portion of a display area than is the end face of the light guide.

13. A reflective type liquid crystal display apparatus, comprising:
- a reflective type liquid crystal display device for displaying images by reflecting incident light in such a manner that the incident light is separately controlled for each pixel;
- a front light positioned at a front face side of the reflective type liquid crystal display device, the front light including a light source and a light guide, wherein light emitted from the light source enters the light guide from an end face thereof near the light source, and the light is output from a large face of the light guide which faces the liquid crystal display device; and
- a protection member for covering at least part of the reflective type liquid crystal display device and at least part of the front light, wherein a window is formed in the protection member at a front face side of the front light for a viewer to observe the images displayed on the reflective type liquid crystal display device,
- wherein, at a side of the front light in which the light source is not provided, a distance between an end face of the window formed in the protection member and an end face of the light guide adjacent thereto is determined so that the end face of the window is laterally offset from the end face of the light guide and is closer to a central portion of a display area than is the end face of the light guide; and
- wherein the protection member covers an end portion of the light guide such that distance X1 between an end face of the window and an end face of the light guide is within the following range:

$$0 \leq X1 \leq \sum_{i=1}^{g} (t_{i+1} / \tan(90° - \sin^{-1}((n_i/n_{i+1})X\sin\theta_i)))$$

(where $t_{i+1}$ is a thickness of the (i+1) th layer; $n_i$ and $n_{i+1}$ are refractive indices of the i-th layer and the (i+1)th layer, respectively; angle $\theta_i$ is an angle between a direction of light incident on the i-th layer and a direction perpendicular to the front light; the angle $\theta_1$ in the $1^{st}$ layer is a maximum angle within a desirable viewing angle range; and the relationship $n_i \times \sin \theta_i = n_{i+1} \times \sin \theta_{i+1}$ is satisfied); and
the front light includes g layers; the adjacent layers have different refractive indices; the g-th layer is adjacent to the light guide; and the (g+1)th layer is the light guide.

14. A reflective type liquid crystal display apparatus according to claim 13 wherein, when i=1, $n_1$=1.00.

15. A reflective type liquid crystal display apparatus according to claim 13 wherein, when i=1, $\theta_1$=80°.

16. A reflective type liquid crystal display apparatus according to claim 2, wherein:
the protection member covers an end portion of the light guide such that distance X1 between an end face of the window and an end face of the light guide is within the following range:

$$\sum_{i=1}^{g} (t_{i+1} / \tan(90° - \sin^{-1}((n_i/n_{i+1})x\sin\varphi_i))) \leq$$

$$X1 \leq \sum_{i=1}^{g} (t_{i+1} / \tan(90° - \sin^{-1}((n_i/n_{i+1})X\sin\theta_i)))$$

(where $t_{i+1}$ is a thickness of the (i+1)th layer; $n_i$ and $n_{i+1}$ are refractive indices of the i-th layer and the (i+1)th layer, respectively; angle $\theta_i$ is an angle between a direction of light incident on the i-th layer and a direction perpendicular to the front light, the angle $\theta_1$ in the $1^{st}$ layer is a maximum angle within a desirable viewing angle rage; angle $\phi_i$ is an angle between a direction of light incident on the i-th layer and a direction perpendicular to the front light; the angle $\phi_i$ in the $1^{st}$ layer is a perspective angle; and the relationships $n_i \times \sin \theta_i = n_{i+1} \times \sin \theta_{i+1}$, and $n_i \times \sin \phi_i = n_{i+1} \times \sin \phi_{i+1}$ are satisfied); and
the front light includes g layers; the adjacent layer have different refractive indices; the g-th layer is adjacent to the light guide; and the (g+1)th layer is the light guide.

17. A reflective type liquid crystal display apparatus according to claim 16, wherein the perspective angle $\phi_1$ in the 1st layer (i=1) is smaller than 4°.

18. A reflective type liquid crystal display apparatus, comprising:
- a reflective type liquid crystal display device for displaying images by reflecting incident light in such a manner that the incident light is separately controlled for each pixel;
- a front light positioned at a front face side of the reflective type liquid crystal display device, the front light including a light source and a light guide, wherein light emitted from the light source enters the light guide from an end face thereof near the light source, and the light is output from a large face of the light guide which faces the liquid crystal display device; and
- a protection member for covering the reflective type liquid crystal display device and the front light, wherein a window is formed in the protection manner at a front face side of the front light for a viewer to observe the images displayed on the reflective type liquid crystal display device,
- wherein, at a side of the front light in which the light source is provided, a distance between an end face of the window formed in the protection member and an end face of light guide adjacent thereto is determined so that light which is emitted from the light source and reflected by a lower face of the front light is not observed by the viewer, wherein the end face of the window is laterally offset from the end face of the light guide and is closer to a central portion of a display area than is the end face of the light guide; and
- wherein the front light further comprises an optical film provided on the large face of the light guide which faces the liquid crystal display device, and wherein a two dimensional area defined by the optical film is greater than a two dimensional area defined by the window formed in the protection member, but less than a two dimensional area defined by the light guide, so that at least a portion of a peripheral edge of the optical film is located between the end face of the window and the end face of the light guide as viewed from a front of the display apparatus.

19. A reflective type liquid crystal display apparatus according to claim 18, wherein:
the protection member covers an end portion of the light guide such that distance X2 between an end face of the window and an end face of the light guide is within the following range:

$$0 \leq X2 \leq \left\{\sum_{i=1}^{g}(t_{i+1}/\tan(90° - \sin^{-1}((n_i/n_{i+1})X\sin\theta_i)))\right\} +$$
$$(t_{g+1}/\tan(90° - \sin^{-1}((n_g/n_{g+1})X\sin\theta_g)))$$

(where $t_{i+1}$ is a thickness of the (i+1)th layer: $n_i$ and $n_{i+1}$ are refractive indices of the i-th layer and the (i+1)th layer, respectively; angle $\theta_i$ is an angle between a direction of light incident on the i-th layer and a direction perpendicular to the front light; the angle $\theta_1$ in the 1st layer is a maximum angle within a desirable viewing angle range; and the relationship $n_i \times \sin\theta_i = n_{i+1} \times \sin\theta_{i+1}$ is satisfied); and
the front light includes g layers; the adjacent layers have different refractive indices; the g-th layer is adjacent to the light guide; and the (g+1)th layer is the light guide.

20. A reflective type liquid crystal display apparatus according to claim 19 wherein, when i=1, $n_1$=1.00.

21. A reflective type liquid crystal display apparatus according to claim 19 wherein, when i=1, $\theta_1$=80°.

22. A reflective type liquid crystal display apparatus according to claim 18, wherein:
the protection member covers an end portion of the light guide such that distance X2 between an end face of the window and an end face of the light guide is within the following range:

$$\sum_{j=1}^{g}(t_{i+1}/\tan(90° - \sin^{-1}((n_i/n_{i+1})X\sin\varphi_i))) +$$
$$(t_{g+1}/\tan(90° - \sin^{-1}((n_g/n_{g+1})X\sin\varphi_g))) \leq$$
$$X2 \leq \left\{\sum_{i=1}^{g}(t_{i+1}/\tan(90° - \sin^{-1}((n_i/n_{i+1})X\sin\theta_i)))\right\} +$$
$$(t_{g+1}/\tan(90° - \sin^{-1}((n_g/n_{g+1})X\sin\theta_g)))$$

(where $t_{i+1}$ is a thickness of the (i+1)th layer; $n_i$ and $n_{i+1}$ are refractive indices of the i-th layer and the (i+1)th layer, respectively; angle $\theta_i$ is an angle between a direction of light incident on the i-th layer and a direction perpendicular to the front light; the angle $\theta_1$ in the 1st layer is a maximum angle within a desirable viewing angle range; angle $\phi_i$ is an angle between a direction of light incident on the i-th layer and a direction perpendicular to the front light: the angle $\phi_1$ in the 1st layer is a perspective angle; and the relationships $n_i \times \sin\theta_i = n_{i+1} \times \sin\theta_{i+1}$, and $n_i \times \sin\phi_i = n_{i+1} \times \sin\phi_{i+1}$ are satisfied); and
the front light includes g layers; the adjacent layers have different refractive indices: the g-th layer is adjacent to the light guide; and the (g+1)th layer is the light guide.

23. A reflective type liquid crystal display apparatus according to claim 21, wherein the perspective angle $\phi_1$ in the 1st layer (i=1) is smaller than 4°.

24. A reflective type liquid crystal display apparatus according to claim 18, wherein:
at a side in which the light source is provided, the protection member covers an end portion of the optical film such that distance X4 between an end face of the window
and an end face of the optical film is within the following range:

$$0 \leq X4 \leq \left\{\sum_{k=1}^{m}(t_{k+1}/\tan(90° - \sin^{-1}((n_k/n_{k+1})X\sin\theta_k)))\right\} +$$
$$(t_m/\tan(90° - \sin^{-1}((n_{m-1}/n_m)X\sin\theta_{m-1}))) +$$
$$(t_{m+1}/\tan(90° - \sin^{-1}((n_m/n_{m+1})X\sin\theta_m)))$$

(where $t_{k+1}$ is a thickness of the (k+1)th layer; $n_k$ and $n_{k+1}$ are refractive indices of the k-th layer and the (k+1)th layer, respectively; angle $\theta_k$ is an angle between a direction of light incident on the k-th layer and a direction perpendicular to the front light; the angle $\theta_1$ in the $1^{st}$ layer is a maximum angle within a desirable viewing angle range; and the relationship $n_k \times \sin\theta_k = n_{k+1} \times \sin\theta_{k+1}$ is satisfied); and
the front light includes m layers; the adjacent layers have different refractive indices; the m-th layer is the light guide; and the (m+1)th layer is the optical film.

25. A reflective type liquid crystal display apparatus according to claim 24 wherein, when k=1, $n_1$=1.00.

26. A reflective type liquid crystal display apparatus according to claim 24 wherein, when k=1, $\theta_1$=80°.

27. A reflective type liquid crystal display apparatus according to claim 18, wherein:
the protective member covers an end portion of the optical film such that distance X4 between an end face of the window and an end face of the optical film is within the following range:

$$\sum_{k=1}^{m}(t_{k+1}/\tan(90° - \sin^{-1}((n_k/n_{k+1})X\sin\varphi_k))) +$$
$$(t_m/\tan(90° - \sin^{-1}((n_{m-1}/n_m)X\sin\varphi_{m-1}))) +$$
$$(t_{m+1}/\tan(90° - \sin^{-1}((n_m/n_{m+1})X\sin\varphi_m))) \leq$$
$$x4 \leq \left\{\sum_{k=1}^{m}(t_{k+1}/\tan(90° - \sin^{-1}((n_k/n_{k+1})X\sin\theta_k)))\right\} +$$
$$(t_m/\tan(90° - \sin^{-1}((n_{m-1}/n_m)X\sin\theta_{m-1}))) +$$
$$(t_{m+1}/\tan(90° - \sin^{-1}((n_m/n_{m+1})X\sin\theta_m)))$$

(where $t_{k+1}$) is a thickness of the (k+1)th layer; $n_k$ and $n_{k+1}$ are refractive indices of the k-th layer and the (k+1)th layer, respectively; angle $\theta k$ is an angle between a direction of light incident on the k-th layer and a direction perpendicular to the front light; the angle $\theta_1$ in the $1^{st}$ layer is a maximum angle with a desirable viewing angle range; angle $\phi_k$ is an angle between a direction of light incident on the k-th layer and a direction perpendicular to the front light; the angle $\phi_1$ in the $1^{st}$ layer is a perspective light; and the relationships $n_k \times \sin\theta_k = n_{k+1} \times \sin\theta_{k+1}$, and $n_k \times \sin\phi_{k=nk+1} \times \sin\phi_{k+1}$ are satisfied); and the front light includes m layers; the adjacent layers have different refractive indices; the m-th layer is the light guide; and the (m+1)th layer is the optical film.

28. A reflective type liquid crystal display apparatus according to claim 27, wherein the perspective angle in the 1st layer (k=1) is smaller than 4°.

29. A reflective type liquid crystal display apparatus according to claim 18, wherein the optical film has an anti-reflection effect.

30. A reflective type liquid crystal display apparatus according to claim 18, wherein the optical film includes a polarizing plate and a quarter-wave plate.

31. A reflective type liquid crystal display apparatus according to claim 18, wherein the optical film includes a polarizing plate, a half-wave plate, and a quarter-wave plate.

32. Portable electronic equipment comprising the reflective type liquid crystal, display apparatus of claim 18.

33. A reflective type liquid crystal display apparatus, comprising:
   a reflective type liquid crystal display device for displaying images by reflecting incident light in such a manner that the incident light is separately controlled for each pixel;
   a front light positioned at a front face side of the reflective type liquid crystal display device, the front light including a light source and a light guide, wherein light emitted from the light source enters the light guide from an end face thereof near the light source, and the light is output from a large face of the light guide which faces the liquid crystal display device; and
   a protection member for covering the reflective type liquid crystal display device and at least part of the front light, wherein a window is formed in the protection member at a front face side of the front light for a viewer to observe the images displayed on the reflective type liquid crystal display device,
   wherein, at a side of the front light in which the light source is not provided, a distance between an end face of the window formed in the protection member and an end face of the light guide adjacent thereto is determined so that the end face of the window is laterally offset from the end face of the light guide and is closer to a central portion of a display area than is the end face of the light guide; and
   wherein the front light further comprises an optical film provided on the large face of the light guide which faces the liquid crystal display device, and wherein a two dimensional area defined by the optical film is greater than a two dimensional area defined by the window formed in the protection member, but less than a two dimensional area defined by the light guide, so that at least a portion of a peripheral edge of the optical film is located between the end face of the window and the end face of the light guide as viewed from a front of the display apparatus.

34. A reflective type liquid crystal display apparatus, comprising:
   a reflective type liquid crystal display device for displaying images by reflecting incident light from at least a front light;
   the front light positioned at a front face side of the reflective type liquid crystal display device, the front light comprising a light source and a light guide, wherein light emitted from the light source enters the light guide from an end face thereof and is output from a face of the light guide which faces the liquid crystal display device; and
   a protection member for blocking light and covering the reflective type liquid crystal display device and at least part of the front light, wherein a window is formed in the protection member at a front face side of the front light so that a viewer can observe images displayed on the reflective type liquid crystal display device through the window,
   wherein, at a side of the front light in which the light source is not provided, an end face of the window formed in the protection member is laterally offset from an end face of the light guide so that the end face of the window is closer to a central portion of a display area than is the end face of the light guide, and wherein a front face side of the light guide defines a surface area larger than an area defined by the window formed in the protection member; and
   wherein the front light further comprises an optical film provided on the face of the light guide which faces the liquid crystal display device, and wherein a two dimensional area defined by the optical film is greater than a two dimensional area defined by the window formed in the protection member, but less than a two dimensional area defined by the light guide, so that at least a portion of a peripheral edge of the optical film is located between the end face of the window and the end face of the light guide as viewed from a front of the display apparatus.

35. The display apparatus of claim 34, wherein, at the side of the front light in which the light source is not provided, the end face of the window formed in the protection member is laterally offset from the end face of the light guide to a sufficient extent so that a viewer viewing the display from a viewing angle 40 degrees off-axis ($\theta_1=40°$) does not see light leakage.

36. A reflective type liquid crystal display apparatus, comprising:
   a reflective type liquid crystal display device for displaying images by reflecting incident light from at least a front light;
   the front light positioned at a front face side of the reflective type liquid crystal display device, the front light comprising a light source and a light guide, wherein light emitted from the light source enters the light guide from an end face thereof and is output from a face of the light guide which faces the liquid crystal display device; and
   a protection member for blocking light and covering the reflective type liquid crystal display device and at least part of the front light, wherein a window is formed in the protection member at a front face side of the front light so that a viewer can observe images displayed on the reflective type liquid crystal display device through the window,
   wherein, at a side of the front light in which the light source is not provided, an end face of the window formed in the protection member is laterally offset from an end face of the light guide to a sufficient extent (X1) so that a viewer viewing the display from a viewing angle 40 degrees off-axis ($\theta_1=40°$) does not see light leakage; and
   wherein the front light further comprises an optical film provided on the face of the light guide which faces the liquid crystal display device, and wherein a two dimensional area defined by the optical film is greater than a two dimensional area defined by the window formed in the protection member, but less than a two dimensional area defined by the light guide, so that at least a portion of a peripheral edge of the optical film is located between the end face of the window and the end face of the light guide as viewed from a front of the display apparatus.

37. The display apparatus of claim 36, wherein at the side of the front light in which the light source is not provided, the end face of the window formed in the protection member is laterally offset from the end face of the light guide to a sufficient extent (X1) so that light incident at an angle of 40 degrees passes through a lower face of the light guide.

* * * * *